United States Patent
Chu et al.

(10) Patent No.: US 10,148,412 B1
(45) Date of Patent: Dec. 4, 2018

(54) METHODS AND APPARATUS FOR CLOCK DRIFT MITIGATION

(71) Applicant: Marvell International Ltd., Hamilton (BM)

(72) Inventors: Liwen Chu, San Ramon, CA (US); Sagar A. Tamhane, Santa Clara, CA (US); Hongyuan Zhang, Fremont, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 15/193,991

(22) Filed: Jun. 27, 2016

Related U.S. Application Data

(60) Provisional application No. 62/184,367, filed on Jun. 25, 2015.

(51) Int. Cl.
   *H04L 7/00* (2006.01)
   *H04L 29/06* (2006.01)
   (Continued)

(52) U.S. Cl.
   CPC .......... *H04L 7/0012* (2013.01); *H04L 5/0055* (2013.01); *H04L 69/28* (2013.01); *H04W 88/12* (2013.01)

(58) Field of Classification Search
   CPC ... H04L 7/0008–7/007; H04L 5/0053–5/0057; H04L 69/28
   See application file for complete search history.

(56) References Cited

U.S. PATENT DOCUMENTS 6,199,169 B1 * 3/2001 Voth .......................... G06F 1/14
                                                         709/248
7,302,225 B2   11/2007 Younis
(Continued)

FOREIGN PATENT DOCUMENTS

WO     WO-2009/059229        5/2009

OTHER PUBLICATIONS

IEEE P1588™ D2.2 "Draft Standard for a Precision Clock Synchronization Protocol for Networked Measurement and Control Systems," *The Institute of Electrical and Electronics Engineers, Inc.*, 2008.
(Continued)

*Primary Examiner* — Gennadiy Tsvey

(57) ABSTRACT

A controller of a first communication device records a first time value of a first clock corresponding to transmission of a first communication frame associated with a timing measurement procedure. If an acknowledgment of the first communication frame was received by the first communication device, the controller records a second time value of the first clock. The controller receives a data unit corresponding to a second communication frame associated with the timing measurement procedure, wherein the data unit includes a time value of a second clock. If an acknowledgment of the first communication frame was not received, the controller compares the first time value of the first clock to the time value of the second clock, and uses i) the first time value of the first clock, and ii) the time value of the second clock to adjust time values corresponding to the first clock responsive to the comparison.

10 Claims, 12 Drawing Sheets

(51) Int. Cl.
*H04L 5/00* (2006.01)
*H04W 88/12* (2009.01)

(56) References Cited

U.S. PATENT DOCUMENTS

| | | | |
|---|---|---|---|
| 7,738,500 B1* | 6/2010 | Jones | H04J 3/0664 370/503 |
| 7,742,390 B2 | 6/2010 | Mujtaba | |
| 8,023,976 B2 | 9/2011 | Shao et al. | |
| 8,270,909 B2 | 9/2012 | Zhang et al. | |
| 8,289,869 B2 | 10/2012 | Sawai | |
| 8,332,732 B2 | 12/2012 | Lakkis | |
| 8,619,907 B2 | 12/2013 | Mujtaba et al. | |
| 8,699,406 B1 | 4/2014 | Charles et al. | |
| 9,125,168 B2* | 9/2015 | Ben-Haim | H04W 24/00 |
| 9,222,785 B2* | 12/2015 | Banin | G01S 5/021 |
| 9,232,493 B2 | 1/2016 | Zhang et al. | |
| 2002/0009974 A1 | 1/2002 | Kuwahara et al. | |
| 2002/0018402 A1* | 2/2002 | Egle | G04G 7/00 368/46 |
| 2002/0136198 A1* | 9/2002 | Findikli | H04J 3/0685 370/350 |
| 2005/0026563 A1 | 2/2005 | Leeper et al. | |
| 2005/0041692 A1* | 2/2005 | Kallstenius | H04J 3/0667 370/503 |
| 2006/0234724 A1 | 10/2006 | Syrjarinne et al. | |
| 2009/0086764 A1* | 4/2009 | Lee | H04J 3/0667 370/503 |
| 2009/0196163 A1 | 8/2009 | Du | |
| 2010/0054244 A1* | 3/2010 | Tamura | H04J 3/0667 370/389 |
| 2010/0309834 A1 | 12/2010 | Fischer et al. | |
| 2011/0002219 A1 | 1/2011 | Kim et al. | |
| 2011/0019699 A1* | 1/2011 | Sun | H03L 7/0807 370/509 |
| 2011/0035511 A1* | 2/2011 | Biederman | G04G 7/00 709/248 |
| 2011/0150005 A1* | 6/2011 | Chen | H04J 3/0667 370/503 |
| 2011/0255528 A1* | 10/2011 | Zakrzewski | H04W 56/009 370/350 |
| 2011/0316589 A1* | 12/2011 | Kim | H04L 7/0337 327/99 |
| 2012/0039196 A1 | 2/2012 | Zhang | |
| 2012/0136956 A1* | 5/2012 | Khoury | H04J 3/0667 709/208 |
| 2012/0159001 A1* | 6/2012 | Liu | G06F 1/14 709/248 |
| 2012/0163261 A1* | 6/2012 | Vedantham | H04W 52/0206 370/311 |
| 2012/0246265 A1* | 9/2012 | Bajko | H04J 3/0667 709/217 |
| 2012/0263165 A1* | 10/2012 | Zakrzewski | H04W 56/009 370/350 |
| 2013/0170507 A1* | 7/2013 | Hsueh | H04L 63/0428 370/503 |
| 2013/0183906 A1* | 7/2013 | Tavildar | H04W 56/002 455/67.11 |
| 2013/0195443 A1* | 8/2013 | Yin | H04J 3/0667 398/25 |
| 2014/0254511 A1* | 9/2014 | Aldana | H04W 56/003 370/329 |
| 2014/0269549 A1* | 9/2014 | Stephens | H04W 74/0891 370/329 |
| 2014/0334582 A1* | 11/2014 | Bock | G06F 1/12 375/356 |
| 2015/0139212 A1* | 5/2015 | Wang | G01S 5/06 370/338 |
| 2015/0382152 A1* | 12/2015 | Lindskog | H04W 64/00 455/456.2 |
| 2016/0014565 A1* | 1/2016 | Segev | H04W 4/025 455/456.1 |
| 2016/0044524 A1* | 2/2016 | Ben-Haim | G01S 5/14 370/252 |
| 2016/0112954 A1* | 4/2016 | Amizur | H04W 52/0235 370/311 |

OTHER PUBLICATIONS

IEEE Std. 1588™-2008 (Revision of IEEE Std. 1588-2002), "IEEE Standard for a Precision Clock Synchronization Protocol for Networked Measurement and Control Systems," *The Institute for Electrical and Electronics Engineers, Inc.,* IEEE Standard, pp. 1-289 (Jul. 24, 2008).

IEEE P802.1AS/D0.8, "Draft Standard for Local and Metropolitan Area Networks—Timing and Synchronization for Time-Sensitive Applications in Bridged Local Area Networks," *The Institute of Electrical and Electronics Engineers, Inc.,* pp. 1-149 (May 25, 2007).

Abstract of IEEE 802.1AS Standard, "802.1AS—Timing and Synchronization," *The Institute of Electrical and Electronics Engineers, Inc.,* available at http://www.ieee802.org/1/pages/802.1as.html, 1 page (Mar. 30, 2011).

IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.,* pp. 1-456 (Sep. 2013).

IEEE P802.11ax™/D0.1, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for high efficiency in frequency bands between 1 GHz and 6 GHz," IEEE Computer Society, 221 pages (Mar. 2016).

IEEE Std 80211™ 2012 (Revision of IEEE Std 802. 11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, *The Institute of Electrical and Electronics Engineers, Inc.,* pp. 1-2695 (Mar. 29, 2012).

Aldana et al., IEEE P802.11—Wireless LANs, "CIDs 46,47,48 Regarding Fine Timing Measurement," *The Institute of Electrical and Electronics Engineers, Inc.,* doc.: IEEE 802.11 11-12-1249-04-000m, pp. 1-17 (Jan. 2013).

Chen, "Home Network Basis: Transmission Environments and Wired/Wireless Protocols," Prentice Hall, pp. 1-26 (Jul. 2006).

Corlett et al. "Statistics of One• Way Internet Packet Delays", Internet Engineering Task Force, available at http://tools.ietf.org/id/draft-corlett-statistics-of-packet-delays-00.txt, pp. 1-9 (Aug. 2002).

Gurewitz et al., "Estimating One-Way Delays from Cyclic-Path Delay Measurements," Proc. of Twentieth Annual Joint Conf. of the IEEE Computer and Comm. Societies (IEEE INFOCOM 2001), vol. 2, pp. 1038-1044 (2001).

Gurewitz et al., "One-Way Delay Estimation Using Network Wide Measurements," IEEE Trans. on Information Theory, vol. 52, No. 6, pp. 2710-2724 (2006).

Hiertz et al., "The IEEE 802.11 Universe," IEEE Communications Magazine, pp. 62-70, (Jan. 2010).

Lee, "An Enhanced IEEE 1588 Time Synchronization Algorithm for Asymmetric Communication Link Using Block Burst Transmission", IEEE Communications Letters, vol. 12, No. 9, pp. 687-689 (Sep. 2008).

Lv et al., "An Enhanced IEEE 1588 Time Synchronization for Asymmetric Communication Link in Packet Transport Network," IEEE Communications Letters, vol. 14. No. 8. pp. 764-766 (Aug. 2010).

(56) References Cited

OTHER PUBLICATIONS

Mills et al., "Network Time Protocol Version 4: Protocol and Algorithms Specification," Request for Comments: 5905, *Internet Engineering Task Force (IETF)*, pp. 1-111 (Jun. 2010).
Mills, "Internet Time Synchronization: The Network Time Protocol," Network Working Group Request for Comments, No. 1129, pp. 1-29 (Oct. 1989).
Perahia et al., "Gigabit Wireless LANs: an overview of IEEE 802.11ac and 80211ad," ACM SIGMOBILE Mobile Computing and Communications Review, vol. 15, No. 3, pp. 23-33 (Jul. 2011).
Simanic et al., "Compensation of Asymmetrical Latency for Ethernet Clock Synchronization," Proc. of the 2011 Int'l IEEE Symposium on Precision Clock Synchronization for Measurement, Control and Communication (ISPCS), 2011, pp. 19-24 (2011).
"Wi-Fi Peer-to-Peer (P2P) Technical Specification, Version 1.00", Wi-Fi Alliance, pp. 1-135, Dec. 1, 2009.
Zarick et al., "The Impact of Network Latency on the Synchronization of Real-World IEEE 1588-2008 Devices," Proc. of the 2010 Int'l IEEE Symposium on Precision Clock Synchronization for Measurement, Control and Communication, pp. 135-140 (Sep. 27-Oct. 1, 2010).
U.S. Appl. No. 14/687,705, Chu et al., "Peer to Peer Ranging Exchange," filed Apr. 15, 2015.
U.S. Appl. No. 15/041,911, Chu et al., "Methods and Apparatus for Range Measurement," filed Feb. 11, 2016.
U.S. Appl. No. 15/041,954, Chu et al., "Methods and Apparatus for Range Measurement," filed Feb. 11, 2016.
IEEE Std 802.11-REVmc™/D4.0, Jan. 2015 "Draft Standard for Information technology—Telecommunications and information exchange between systems—Local and metropolitan area networks—Specific requirements, Part 11: Wireless LAN Medium Access Control (MAC) and Physical Layer (PHY) Specifications," *The Institute of Electrical and Electronics Engineers, Inc.*, pp. i-cii, 293-297, 340-344, 390-392, 765, 766, 814-816, 853-859, 895-897, 1050-1054, 1137-1140, 1538-1547, 1673-1676, 1709, 1710, 1734-1743, 2152-2154, 3565, 3566 (Jan. 2015).
IEEE Std 802.11-REVmc™/D5.0, Jan 2016, "Draft Standard for Information technology—Telecommunications and information exchange between systems—Local and metropolitan area networks—Specific requirements, Part 11: Wireless LAN Medium Access Control (MAC) and Physical Layer (PHY) Specifications," *The Institute of Electrical and Electronics Engineers, Inc.*, pp. i-ciii, 293-297, 339-343, 389-391, 777, 778, 825-827, 864-870, 907-909, 1063-1067, 1157-1160, 1554-1572, 1702-1707, 1739, 1740, 1764-1773, 2188, 2189, 3597, 3598 (Jan. 2016).

\* cited by examiner

Capture TSF time (TSF_RSTA) when prompting network interface to transmit FTM frame 804

↓

Cause network interface to transmit FTM frame that includes TSF_RSTA 808

Capture TSF time (TSF_ISTA) when FTM frame received from RSTA, the FTM frame having TSF_RSTA 854

↓

Use TSF_ISTA and TSF_RSTA in FTM frame to adjust TSF time 858

METHODS AND APPARATUS FOR CLOCK DRIFT MITIGATION

CROSS REFERENCES TO RELATED APPLICATIONS

This application claims the benefit of U.S. Provisional Patent App. No. 62/184,367, entitled "Clock Drift Mitigation and Neighbor Report Optimization," filed on Jun. 25, 2015, the disclosure of which is hereby expressly incorporated herein by reference in its entirety.

FIELD OF TECHNOLOGY

The present disclosure relates generally to wireless communication systems, and more particularly, to mitigating clock drift in wireless communication devices.

BACKGROUND

In some wireless communication systems, communications are scheduled using timing information, such as a time of day. For example, in many communication systems, communication devices maintain respective clocks, and each communication device uses its clock for purposes of determining when the communication device should transmit, when to expect another communication device to transmit, etc. Over time, clocks of different communication devices will drift with respect to each other, which may cause degradation in performance.

SUMMARY

In an embodiment, a method includes: recording, at a controller of a first communication device, a first time value of a first clock corresponding to transmission of a first communication frame associated with a timing measurement procedure; and if an acknowledgment of the first communication frame was received by the first communication device, recording, at the controller, a second time value of the first clock corresponding to reception of the acknowledgment at the first communication device. The method also includes: receiving, at the controller, a data unit corresponding to a second communication frame associated with the timing measurement procedure, wherein the data unit includes a time value of a second clock; and if the acknowledgment of the first communication frame was received by the first communication device, using, at the controller, i) the second time value of the first clock, and ii) the time value of the second clock to adjust time values corresponding to the first clock. Additionally, the method includes, if the acknowledgment of the first communication frame was not received by the first communication device, comparing, at the controller, the first time value of the first clock to the time value of the second clock, and using, at the controller, i) the first time value of the first clock, and ii) the time value of the second clock to adjust time values corresponding to the first clock responsive to comparing the first time value of the first clock to the time value of the second clock.

In another embodiment, an apparatus comprises a controller configured to execute machine readable instructions; and a memory coupled to the controller. The memory stores machine readable instructions that, when executed by the controller, cause the controller to: record a first time value of a first clock corresponding to transmission of a first communication frame associated with a timing measurement procedure; and if an acknowledgment of the first communication frame was received by the first communication device, record a second time value of the first clock corresponding to reception of the acknowledgment at the first communication device. The memory further stores machine readable instructions that, when executed by the controller, cause the controller to: receive a data unit corresponding to a second communication frame associated with the timing measurement procedure, wherein the data unit includes a time value of a second clock; and if the acknowledgment of the first communication frame was received by the first communication device, use i) the second time value of the first clock, and ii) the time value of the second clock to adjust time values corresponding to the first clock. Additionally, the memory stores machine readable instructions that, when executed by the controller, cause the controller to: if the acknowledgment of the first communication frame was not received by the first communication device, compare the first time value of the first clock to the time value of the second clock, and use the first time value of the first clock, and ii) the time value of the second clock to adjust time values corresponding to the first clock responsive to comparing the first time value of the first clock to the time value of the second clock.

In yet another embodiment, a method includes: receiving, at a controller of a first communication device, an indication of a fine timing measurement (FTM) request communication frame from a second communication device, the FTM request communication frame associated with an FTM procedure; recording, at the controller, a first time value of a clock corresponding to transmission of a first FTM communication frame responsive to the FTM request communication frame; and causing, at the controller, a network interface of the first communication device to transmit the first FTM communication frame so that the first FTM communication frame includes the first time value of the clock.

In still another embodiment, an apparatus comprises: a controller of a first communication device, the controller configured to execute machine readable instructions; and a memory coupled to the controller. The memory stores machine readable instructions that, when executed by the controller, cause the controller to: receive an indication of an FTM request communication frame from a second communication device, the FTM request communication frame associated with an FTM procedure; record a first time value of a clock corresponding to transmission of a first FTM communication frame responsive to the FTM request communication frame; and cause a network interface of the first communication device to transmit the first FTM communication frame so that the first FTM communication frame includes the first time value of the clock.

BRIEF DESCRIPTION OF THE DRAWINGS

FIG. 8A is a flow diagram of an example method for a first communication device to provide a timer value to a second communication device, according to an embodiment.

FIG. 8B is a flow diagram of another example method of adjusting time values of a timer of a communication device, according to an embodiment.

DETAILED DESCRIPTION

Clock drift mitigation techniques described below are discussed in the context of wireless local area networks (WLANs) that utilize protocols the same as or similar to protocols defined by the 802.11 Standard from the Institute of Electrical and Electronics Engineers (IEEE) merely for explanatory purposes. In other embodiments, however, clock drift mitigation techniques are utilized in other types of wireless communication systems such as personal area networks (PANs), mobile communication networks such as cellular networks, metropolitan area networks (MANs), satellite communication networks, etc.

Figure 1:
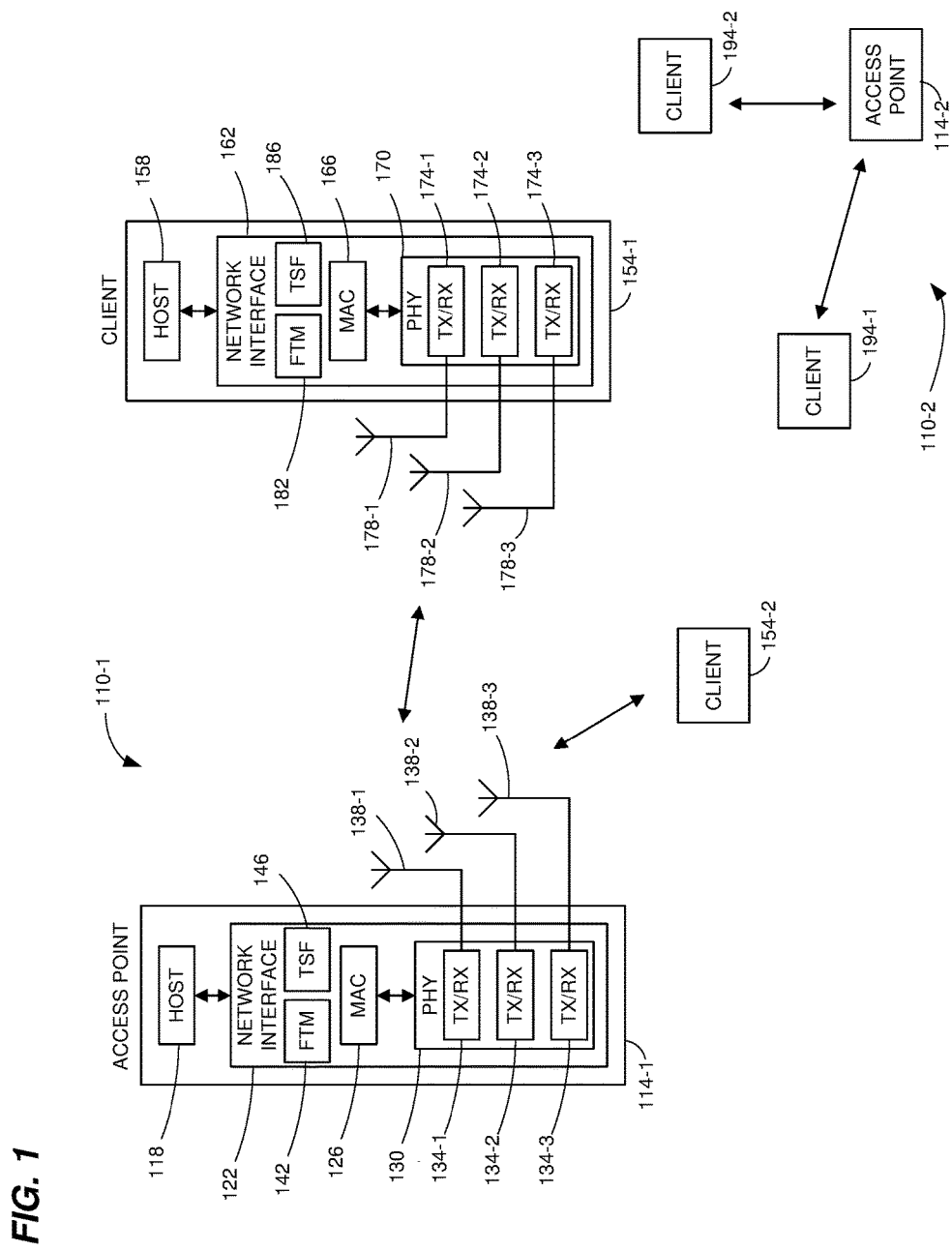
FIG. 1 is a block diagram of an example communication system in which one or more example clock drift mitigation techniques are utilized, according to an embodiment.

FIG. 1 is a block diagram of an example communication system including multiple WLANs 110, according to an embodiment. For example, a first WLAN 110-1 includes an access point (AP) 114-1 that comprises a host processor 118 coupled to a network interface device 122. In an embodiment, the network interface 122 includes one or more integrate circuits (ICs) configured to operate as discussed below. The network interface 122 includes a medium access control (MAC) processor 126 and a physical layer (PHY) processor 130. The PHY processor 130 includes a plurality of transceivers 134, and the transceivers 134 are coupled to a plurality of antennas 138. Although three transceivers 134 and three antennas 138 are illustrated in FIG. 1, the AP 114-1 includes other suitable numbers (e.g., 1, 2, 4, 5, etc.) of transceivers 134 and antennas 138 in other embodiments. In some embodiments, the AP 114-1 includes a higher number of antennas 138 than transceivers 134, and antenna switching techniques are utilized. In an embodiment, the MAC processor 126 is implemented on at least a first IC, and the PHY processor 130 is implemented on at least a second IC.

In an embodiment, at least a portion of the MAC processor 126 and at least a portion of the PHY processor 130 are implemented on a single IC.

In various embodiments, the MAC processor 126 and/or the PHY processor 130 of the AP 114-1 are configured to generate data units, and process received data units, that conform to a WLAN communication protocol such as a communication protocol conforming to the IEEE 802.11 Standard or another suitable wireless communication protocol. In an embodiment, the MAC processor 126 is configured to implement MAC layer functions, including MAC layer functions of the WLAN communication protocol. In an embodiment, the PHY processor 130 is configured to implement PHY functions, including PHY functions of the WLAN communication protocol. For example, in an embodiment, the MAC processor 126 is configured to generate MAC layer data units such as MAC protocol data units (MPDUs), MAC control frames, etc., and provide the MAC layer data units to the PHY processor 130. In an embodiment, the PHY processor 130 is configured to receive MAC layer data units from the MAC processor 126 and encapsulate the MAC layer data units to generate PHY data units such as PHY protocol data units (PPDUs) for transmission via the antennas 138. Similarly, in an embodiment, the PHY processor 130 is configured to receive PHY data units that were received via the antennas 138, and extract MAC layer data units encapsulated within the PHY data units. In an embodiment, the PITY processor 130 provides the extracted MAC layer data units to the MAC processor 126, which processes the MAC layer data units.

In an embodiment, the network interface 122 of the AP 114-1 includes a fine timing measurement (FTM) controller 142 configured to perform an FTM procedure for measuring a time of flight (ToF) of a radio frequency (RF) signal between two network devices. In an embodiment, the ToF is used to measure a range (i.e., distance) between the network devices. In some embodiments, range measurements are further used to calculate estimates of positions of network devices. Examples of FTM procedures implemented by the FTM controller 142, according to some embodiments, are described below. For instance, in some embodiments, the FTM controller 142 causes the network interface 122 to transmit communication frames for purposes of measuring a time of flight between the AP 1144 and another communication device.

In some embodiments, the FTM controller 142 performs functions corresponding to a layer in a communication protocol stack above the MAC layer. Thus, in some embodiments, the FTM controller 142 interfaces, directly or indirectly (e.g., via one or more layers in the communication protocol stack between the FTM functions and the MAC layer), with the MAC processor 126 to cause the network interface 122 to transmit communication frames for purposes of measuring a time of flight between the AP 114-1 and another communication device. Similarly, in some embodiments, the MAC processor 126 forwards, directly or indirectly, data units to the FTM controller 142 that were received by the AP 114-1 as part of a frame exchange with another communication device for measuring a time of flight.

In some embodiments, the FTM controller 142 performs functions corresponding to a sublayer within the MAC layer.

In some embodiments, the FTM controller 142 comprises a processor configured to execute machine readable instructions stored in a memory of, or coupled to, the FTM controller 142. In some embodiments, the FTM controller 142 comprises hardwired state machine circuitry. In some embodiments, the FTM controller 142 comprises hardwired state machine circuitry and a processor configured to execute machine readable instructions stored in a memory of, or coupled to, the FTM controller 142.

In some embodiments, the network interface 122 of the AP 114-1 includes a timer (e.g., a clock) 146 that the network interface 122 uses to maintain a reference time corresponding to the network 110-1. In some embodiments, the timer 146 maintains a local version of a timing synchronization function (TSF) timer defined by the IEEE 802.11 Standard. TSF is used to maintain synchronization of all devices in a same basic service set (BSS). Each device maintains its own TSF time (e.g., using a local timer such as the timer 146). Devices in the BSS exchange information (e.g., in beacon frames, etc.) that includes the TSF times of respective devices, and devices may set their respective TSF times to a same value as other devices to maintain timing synchronization.

The WLAN 110-1 includes a plurality of client stations 154. Although two client stations 154 are illustrated in FIG. 1, the WLAN 110-1 includes other suitable numbers (e.g., 1, 3, 4, 5, 6, etc.) of client stations 154 in various scenarios and embodiments. The client station 154-1 includes a host processor 158 coupled to a network interface device 162. In an embodiment, the network interface 162 includes one or more ICs configured to operate as discussed below. The network interface 162 includes a MAC processor 166 and a PHY processor 170. The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized. In an embodiment, the MAC processor 166 is implemented on at least a first IC, and the PHY processor 170 is implemented on at least a second IC. In an embodiment, at least a portion of the MAC processor 166 and at least a portion of the PITY processor 170 are implemented on a single IC.

In various embodiments, the MAC processor 166 and the PHY processor 170 of the client device 154-1 are configured to generate data units, and process received data units, that conform to the WLAN communication protocol or another suitable communication protocol. In an embodiment, the MAC processor 166 is configured to implement MAC layer functions, including MAC layer functions of the WLAN communication protocol. In an embodiment, the PHY processor 170 is configured to implement PHY functions, including PHY functions of the WLAN communication protocol. For example, in an embodiment, the MAC processor 166 is configured to generate MAC layer data units such as MPDUs, MAC control frames, etc., and provide the MAC layer data units to the PHY processor 170. In an embodiment, the PHY processor 170 is configured to receive MAC layer data units from the MAC processor 166 and encapsulate the MAC layer data units to generate PHY data units such as PPDUs for transmission via the antennas 178. Similarly, in an embodiment, the PHY processor 170 is configured to receive PHY data units that were received via the antennas 178, and extract MAC layer data units encapsulated within the PHY data units. In an embodiment, the PHY processor 170 provides the extracted MAC layer data units to the MAC processor 166, which processes the MAC layer data units.

In an embodiment, the network interface 162 of the client station 154-1 includes an FTM controller 182 configured to perform an FTM procedure for measuring a ToF of an RF signal between two network devices. In some embodiments, the FTM controller 182 comprises a processor configured to execute machine readable instructions stored in a memory of, or coupled to, the FTM controller 182. In some embodiments, the FTM controller 182 comprises hardwired state machine circuitry. In some embodiments, the FTM controller 182 comprises hardwired state machine circuitry and a processor configured to execute machine readable instructions stored in a memory of, or coupled to, the FTM controller 182.

In some embodiments, the network interface 162 of the client station 154-1 includes a timer (e.g., a clock) 186 that the network interface 162 uses to maintain a reference time corresponding to the network 110-1. In some embodiments, the timer 186 maintains a local version of a TSF timer.

In an embodiment, the client station 154-2 has a structure that is the same as or similar to the client station 154-1. In these embodiments, the client station 154-2 structured the same as or similar to the client station 154-1 has the same or a different number of transceivers and antennas. For example, the client station 154-2 has only two transceivers and two antennas (not shown), according to an embodiment.

The system illustrated in FIG. 1 also includes a WLAN 110-2. The WLAN 110-2 includes an AP 114-2 and a plurality of client stations 194. In an embodiment, the AP 114-2 has a structure that is the same as or similar to the AP 114-1. In these embodiments, the AP 114-2 structured the same as or similar to the AP 114-1 has the same or a different number of transceivers and antennas. For example, the AP 114-2 has only two transceivers and two antennas (not shown), according to an embodiment.

In an embodiment, the client stations 194 each have a respective structure that is the same as or similar to the client station 154-1. In these embodiments, each client station 194 structured the same as or similar to the client station 154-1 has the same or a different number of transceivers and antennas. For example, the client station 194-1 has only two transceivers and two antennas (not shown), according to an embodiment.

Although two client stations 194 are illustrated in FIG. 1, the WLAN 110-2 includes other suitable numbers (e.g., 1, 3, 4, 5, 6, etc.) of client stations 194 in various scenarios and embodiments.

In some embodiments, the AP 114-1 (AP1) exchanges range measurement signals with the AP 114-2 (AP2) to determine a distance between communication devices in the system of FIG. 1. In some embodiments, the determined distances between communication devices are used to determine positions of communication devices in the system of FIG. 1, for example. In some embodiments, the range measurement signals exchanged between AP1 and AP2, and the time of arrival of the range measurement signals at AP1 and AP2, are utilized to determine a distance between AP1 and AP2.

Similarly, in some embodiments, the client station 154-1 (STA1) exchanges range measurement signals with the client station 154-2 (STA2) to determine a distance between communication devices in the system of FIG. 1. In some embodiments, the determined distances between communication devices are used to determine positions of communication devices in the system of FIG. 1, for example. In some embodiments, the range measurement signals exchanged between STA1 and STA2, and the time of arrival of the range measurement signals at STA1 and STA2, are utilized to determine a distance between STA1 and STA2.

Similarly, in some embodiments, STA1 exchanges range measurement signals with the AP1 to determine a distance between communication devices in the system of FIG. 1. In some embodiments, the determined distances between communication devices are used to determine positions of communication devices in the system of FIG. 1, for example. In some embodiments, the range measurement signals exchanged between STA1 and AP1, and the time of arrival of the range measurement signals at STA1 and AP1, are utilized to determine a distance between STA1 and AP1.

Figure 2:
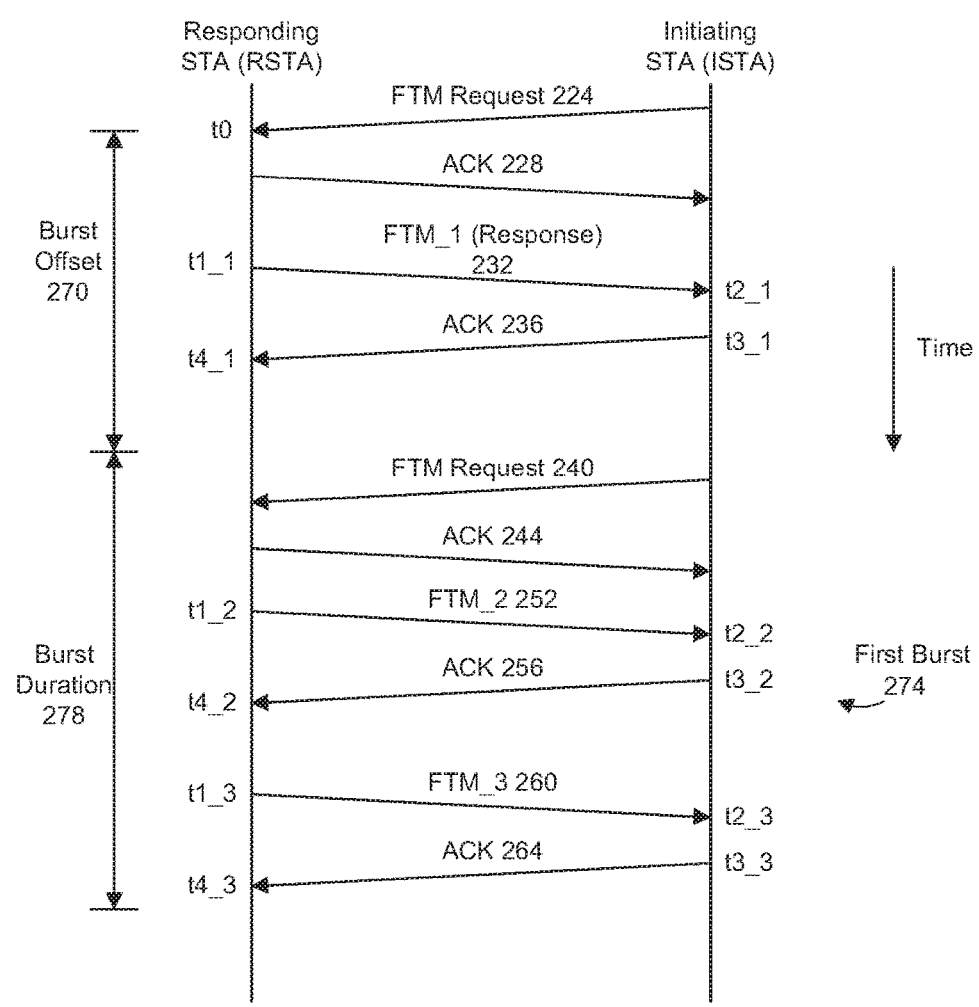
FIG. 2 is a timing diagram of an example frame exchange in a fine timing measurement (FTM) procedure, according to an embodiment.

FIG. 2 is a timing diagram of an example FTM procedure used to measure ToF between two network devices, e.g., an initiating station (ISTA) and a responding station (RSTA), operating in a WLAN such as WLAN 1104 of FIG. 1. ISTA initiates an FTM request by sending a request frame (FTM request) 224 to RSTA. RSTA receives the FTM request 224 at time t0 and responds by sending a corresponding acknowledgment frame (ACK) 228.

The FTM request 224 and the corresponding ACK 228 are followed by RSTA sending an FTM response frame (FTM_1) 232 to ISTA. FTM_1 232 is transmitted at time t1_1 and arrives at a receive antenna of ISTA at time t2_1. ISTA may analyze timestamps in the FTM_1 232 indicative of when FTM_1 232 was transmitted from RSTA (t1_1) and when FTM_1 232 arrived at ISTA (t2_1). ISTA responds by sending an acknowledgement frame 236 to RSTA. The ACK frame 236 is transmitted by ISTA at time t3_1 and arrives at RSTA at time t4_1. RSTA may analyze timestamps in the ACK. 236 indicative of when ACK 236 was transmitted from ISTA (t3_1) and when the ACK 236 arrived at RSTA (t4_1).

STA2 transmits another FTM request 240 to trigger an FTM burst. A group of FTM exchanges is referred to herein as an FTM burst. For example, FIG. 2 illustrates an FTM burst having two FTM exchanges associated with FTM_2 and FTM_3. In other embodiments, an FTM burst may include other suitable number of FTM exchanges, such as one, three, four, five, six, etc.

In the example of FIG. 2, ISTA transmits the FTM request 240 to RSTA at the start of a burst period to notify RSTA that ISTA is ready to receive FTM frames for range measurement. RSTA transmits an ACK 244 and then provides t1_1 and t4_1 to ISTA in an FTM_2 252. ISTA calculates a first round trip time (RTT_1), which is twice the ToF between ISTA and RSTA, as RTT_1=(t4_1−t1_1)−(t3_1−t2_1)= (t2_1−t1_1)+(t4_1−t3_1). The ToF between ISTA and RSTA is RTT/2.

ISTA can perform additional calculations based on further FTM exchanges in the same burst and/or in additional bursts. For example, FTM_2 252 is transmitted at time t1_2 and arrives at a receive antenna of ISTA at time t2_2. ISTA may analyze timestamps in the FTM_2 252 indicative of when FTM_2 252 was transmitted from RSTA (t1_2) and when the FTM_2 252 arrived at ISTA (t2_2). ISTA responds by sending an acknowledgement frame 256 to RSTA. The ACK frame 256 is transmitted by ISTA at time t3_2 and arrives at RSTA at time t4_2. RSTA may analyze timestamps in the ACK 256 indicative of when ACK 256 was transmitted from ISTA (t3_2) and when the ACK 256 arrived at RSTA (t4_2).

RSTA transmits an FTM_3 260, which includes t12 and t4_2 to ISTA. ISTA calculates a second round trip time (RTT_2), which is twice the ToF between ISTA and RSTA, as RTT_2=(t4_2−t1_2)−(t3_2−t2_2)=(t2_2−t1_2)+(t4_2−t3_2).

FTM_3 260 is transmitted at time t1_3 and arrives at a receive antenna of ISTA at time t2_3. ISTA may analyze timestamps in the FTM_3 260 indicative of when FTM_3 260 was transmitted from RSTA (t1_3) and when the FTM_3 260 arrived at ISTA (t2_3). ISTA responds by sending an acknowledgement frame 264 to RSTA. The ACK frame 264 is transmitted by ISTA at time t3_3 and arrives at RSTA at time t4_3. RSTA may analyze timestamps in the ACK 264 indicative of when ACK 264 was transmitted from ISTA (t3_3) and when the ACK 264 arrived at RSTA (t43).

RSTA provides t1_3 and t4_3 to ISTA in another frame (not shown in FIG. 2). ISTA calculates a third round trip time (RTT_3), which is twice the ToF between ISTA and RSTA, as RTT_3=(t4_3−t1_3)−(t3_3−t2_3) (t2_3−t1_3)+(t4_3−t3_3).

In an embodiment, ISTA calculates an estimated ToF using the multiple RTTs (e.g., RTT_1, RTT_2, and RTT_3). For example, in an embodiment, ISTA averages RTT_1, RTT_2, and RTT_3, and uses the average RTT to calculate ToF. In another embodiment, ISTA calculates respective ToF estimates using RTT_1, RTT_2, and RTT_3, and then averages the ToF estimates.

A burst offset 270 corresponds to a duration (e.g., 10 ms) between reception of the FTM request 224 by RSTA and a start of a first burst period 274. Accordingly, the burst offset 270 provides an indication, to the stations ISTA and RSTA, of a start of the first burst period 274. In some embodiments, one or more further burst periods (not shown) follow the first burst period 274. Each burst period has a duration 278, according to some embodiments.

Each of the ISTA and the RSTA uses a respective local TSF timer (e.g., timer 146 and timer 186 in FIG. 1) to determine when a start of a burst period will occur, according to some embodiments. In some embodiments, one or both of the ISTA and the RSTA uses a respective ToD/ToA timer (time of departure/time of arrival), which is different than the local TSF timer, for determining when FTM transmissions are transmitted and received. When the local TSF timers of ISTA and the RSTA are not synchronized, this may cause a mismatch between when the ISTA expects a burst period to occur and when the RSTA expects the burst period to occur.

Figure 3:
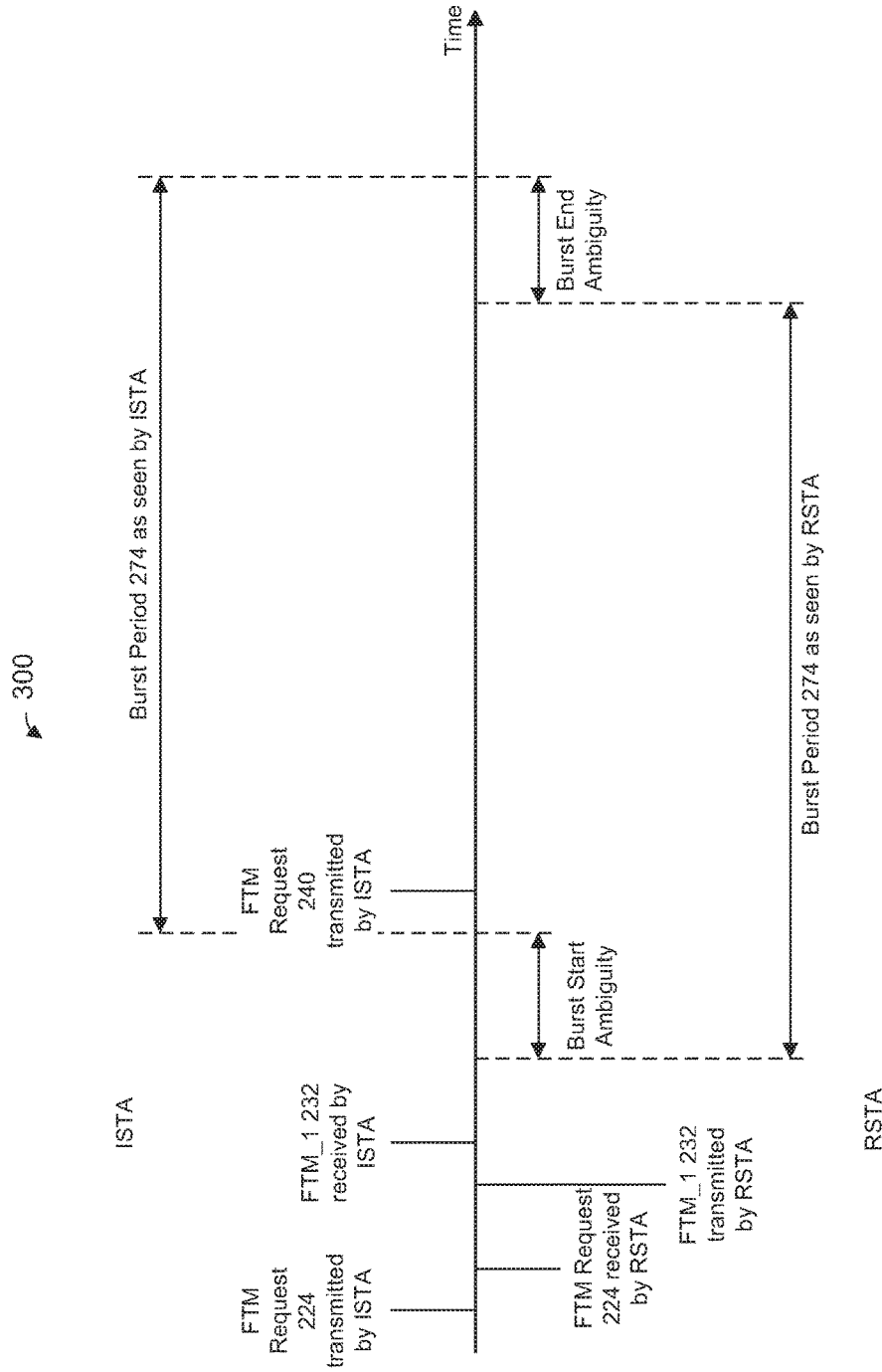
FIG. 3 is a timing diagram that illustrates an effect of unsynchronized timers of respective communication devices during an example FTM procedure, according to an embodiment.

FIG. 3 is a timing diagram 300 that illustrates unsynchronized TSF timers of ISTA and the RSTA causing a mismatch between when the ISTA expects a burst period to occur and when the RSTA expects the burst period to occur. The timing diagram 300 of FIG. 3 corresponds to the communication frame exchange of FIG. 2. In FIG. 3, a top portion corresponds to timing from the standpoint of ISTA, and a bottom portion corresponds to a timing from the standpoint of RSTA.

In the scenario of FIG. 3, because of the local TSF timers of ISTA and RSTA are unsynchronized, RSTA expects the first burst period 274 to occur before ISTA expects the first burst period 274 to occur. For example, in the scenario of FIG. 3, because of the local TSF timers of ISTA and RSTA are unsynchronized, an ambiguity exists regarding when the burst period starts. Similarly, because of the local TSF timers of ISTA and RSTA are unsynchronized, an ambiguity exists regarding when the burst period ends. As a result, RSTA needlessly waits during the burst start ambiguity for the FTM request 240. Additionally, RSTA will stop transmitting FTM frames at the end of the burst period 274, from the standpoint of RSTA, while ISTA needless waits during the burst end ambiguity.

Figure 4:
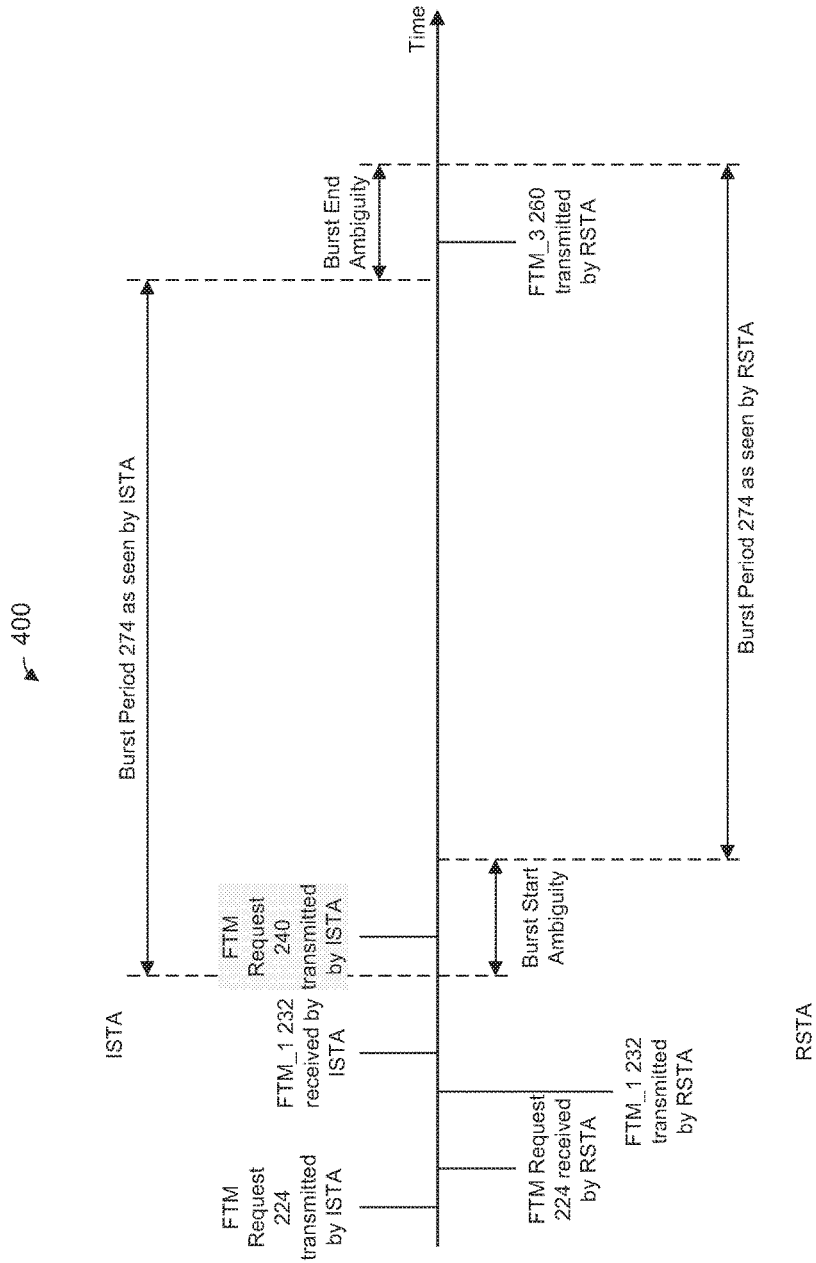
FIG. 4 is a timing diagram that illustrates another effect of unsynchronized timers of respective communication devices during an example FTM procedure, according to an embodiment.

FIG. 4 is a timing diagram 400 that illustrates unsynchronized TSF timers of ISTA and the RSTA causing a mismatch between when the ISTA expects a burst period to occur and when the RSTA expects the burst period to occur. The timing diagram 400 of FIG. 4 corresponds to the communication frame exchange of FIG. 2. In FIG. 4, a top portion corresponds to timing from the standpoint of ISTA, and a bottom portion corresponds to a timing from the standpoint of RSTA.

In the scenario of FIG. 4, because of the local TSF timers of ISTA and RSTA are unsynchronized, RSTA expects the first burst period 274 to occur after ISTA expects the first burst period 274 to occur. For example, in the scenario of FIG. 4, because of the local TSF timers of ISTA and RSTA are unsynchronized, an ambiguity exists regarding when the burst period starts. Similarly, because of the local TSF timers of ISTA and RSTA are unsynchronized, an ambiguity exists regarding when the burst period ends. As a result, RSTA is not prepared when ISTA transmits the FTM request 240. Additionally, RSTA transmit and FTM frame at the end of the burst period 274, from the standpoint of RSTA, when ISTA is not prepared because ISTA has determined that the burst period 274 is already over.

Thus, to better synchronize the TSF timer of ISTA with the TSF time of RSTA, the following approach is utilized, in some embodiments, which is described in the context of AP 114-1 acting as ISTA and the client station 154-1 acting as RSTA, merely as an illustrative embodiment. In other embodiments, another AP acts as RSTA and/or a client station acts as ISTA. In some embodiments, other communication devices having suitable architectures different than the architectures illustrated in FIG. 1 act as ISTA and/or RSTA.

When the FTM controller 142 initiates transmission of the FTM request 224, the FTM controller 142 records a value of the TSF timer 146 (TSF_ISTA). Similarly, when the FTM controller 182 receives an indication that the FTM request 224 was received by the network interface 162, the FTM controller 182 records a value of the TSF timer 186 (TSF_RSTA). When the FTM controller 182 initiates transmission of the FTM frame 232, the FTM controller 182 includes the recorded TSF_RSTA value in the FTM frame 232. When the FTM controller 142 receives the FTM frame 232, the FTM controller 142 uses i) the recorded TSF_RSTA value included in the FTM frame 232 and ii) the recorded TSF_ISTA value (e.g., corresponding to the transmission of FTM request 224) to adjust the TSF timer 146 to be better synchronized with the TSF timer 186.

Figure 5:
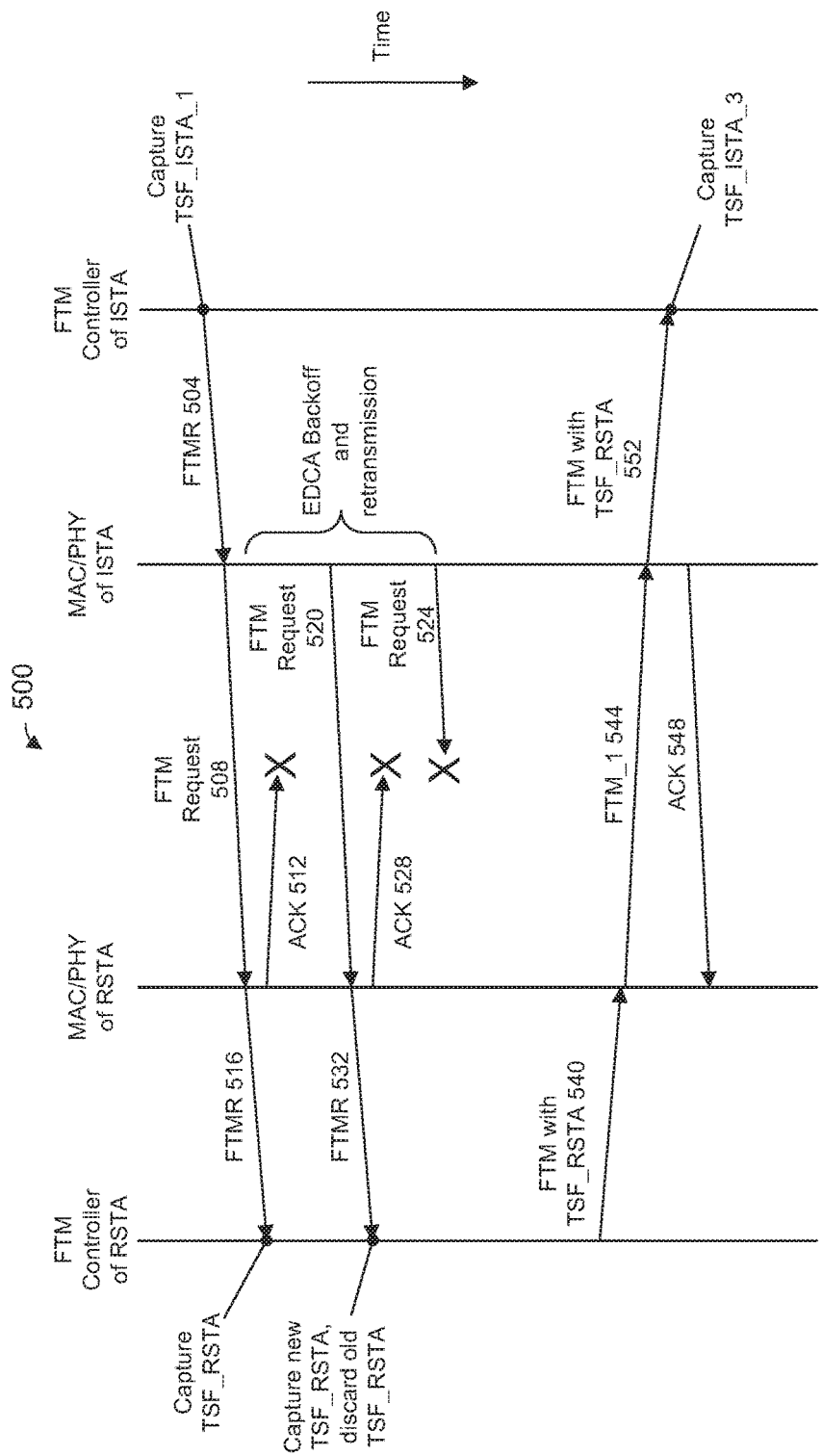
FIG. 5 is a signal diagram illustrating an example technique of adjusting time values of a timer of a communication device, according to an embodiment.

FIG. 5 is a timing diagram 500 of an example FTM frame exchange in which some communication frames are not properly received, according to an embodiment. The timing diagram 500 is described with reference to FIG. 1 merely for explanatory purposes. For example, the timing diagram 500 is described in the context of AP 114-1 acting as ISTA and the client station 154-1 acting as RSTA, merely as an illustrative embodiment. In other embodiments, another AP acts as RSTA and/or a client station acts as ISTA. In some embodiments, other communication devices having suitable architectures different than the architectures illustrated in FIG. 1 act as ISTA and/or RSTA.

Initially, an FTM controller of ISTA (e.g., FTM controller 142) sends an FTM request prompt 504 to a MAC processor (e.g., the MAC processor 126) and/or a PRY processor (e.g., the PHY processor 130) of ISTA to cause a network interface (e.g., the network interface 122) of ISTA to transmit an FTM request frame 508 to RSTA. The FTM controller 142 records a value of the TSF timer of ISTA (e.g., the TSF timer 146) when the FTM request prompt 504 was sent (TSF_ISTA_1).

A network interface (e.g., the network interface 162) of RSTA receives the FTM request frame 508 and generates/transmits an acknowledgment (ACK) 512 to ISTA. Additionally, a MAC processor (e.g., the MAC processor 166) of RSTA sends a data unit 516 to an FTM controller of RSTA (e.g., FTM controller 182) informing the FTM controller of RSTA that the FTM request 508 from ISTA was received.

In the example scenario illustrated in FIG. 5, the ACK 512 is not received by ISTA (e.g., because of a collision with another transmission from a third communication device, poor channel conditions, etc.). Thus, the network interface (e.g., the network interface 122) of ISTA performs a backoff/retransmission procedure in response to a failure to receive an ACK of the FTM request 508, the backoff/retransmission procedure specified by a communication protocol (e.g., a WLAN protocol or another suitable communication protocol) to which the network interface of ISTA conforms, according to an embodiment. For example, in an embodiment, the network interface (e.g., the network interface 122) of ISTA performs an enhanced distributed coordination function channel access (EDCA) procedure (e.g., as defined by the IEEE 802.11 standard) and retransmits the FTM request 508 one or more times (illustrated as retransmission 520 and retransmission 524), according to an embodiment.

In the example scenario illustrated in FIG. 5, the network interface (e.g., the network interface 162) of RSTA receives the FTM request frame retransmission 520 and generates/transmits an acknowledgment (ACK) 528 to ISTA. Additionally, a MAC processor (e.g., the MAC processor 166) of RSTA sends a data unit 532 to the FTM controller of RSTA (e.g., FTM controller 182) informing the FTM controller of RSTA that the FTM request 520 from ISTA was received.

In the example scenario illustrated in FIG. 5, the ACK 528 is not received by ISTA (e.g., because of a collision with another transmission from a third communication device, poor channel conditions, etc.). Thus, the network interface 122 retransmits 524 the FTM request 508. In the example scenario illustrated in FIG. 5, the retransmission 524 is not received by RSTA (e.g., because of a collision with another transmission from a third communication device, poor channel conditions, etc.).

In some embodiments, if the network interface 122 did receive the ACK 512 or the ACK. 528, the network interface 122 would notify the FTM controller 142 of reception of the ACK 512/528, and the FTM controller 142 would record a value of the TSF timer 146 when the FTM controller 142 was notified of the ACK 512/528 (TSF_ISTA_2).

When the FTM controller of RSTA (e.g. FTM controller 182) receives the data unit 516 indicating the reception of the FTM request 508, the FTM controller 182 records a value of the TSF timer (e.g., TSF timer 186) of RSTA when the data unit 516 was received by the FTM controller 182. When the FTM controller 182 receives the data unit 532 indicating the reception of the FTM request 520, the FTM controller 182 discards the recorded TSF time of the reception of data unit 516, and records a value of the TSF timer 186 when the data unit 532 was received by the FTM controller 182.

In response to the data unit 532, the FTM controller 182 sends an FTM prompt 540 to a MAC processor (e.g., the MAC processor 166) and/or a PHY processor (e.g., the PHY processor 170) of RSTA to cause the network interface (e.g., the network interface 162) of RSTA to transmit an FTM frame 544 to ISTA. The data unit 540 includes the recorded TSF time (TSF_RSTA) when the data unit 532 was received by the FTM controller 182. The FTM frame 544 also includes the TSF_RSTA.

The network interface (e.g., the network interface 122) of ISTA receives the FTM frame 544 and generates/transmits an acknowledgment (ACK) 548 to ISTA. Additionally, the MAC processor (e.g., the MAC processor 126) of ISTA sends a data unit 552 to the FTM controller of ISTA (e.g., FTM controller 142) informing the FTM controller 142 that the FTM frame 544 from ISTA was received. The data unit 552 includes the TSF_RSTA. When the FTM controller 142 receives the data unit 552 indicating the reception of the FTM frame 544, the FTM controller 142 records a value of the TSF timer 146 when the data unit 552 was received by the FTM controller 142 (TSF_ISTA_3).

If the ACK 512 or the ACK 528 had been received by the network interface 122, the FTM controller 142 would use TSF_ISTA_2 and TSF_RSTA to adjust the TSF timer 146, according to some embodiments. For example, because of the retransmission of the FTM request 508, the FTM controller 142 of the ISTA determines that TSF_ISTA_2 will provide a more accurate adjustment than TSF_ISTA_1, according to some embodiments. In the scenario of FIG. 5, however, the ACK 512 and the ACK 528 are not received by ISTA.

In an embodiment, the FTM controller 142 uses TSF_ISTA_3 and TSF_RSTA to adjust the TSF timer 146 when an ACK of FTM request 508 is not received by ISTA, at least in some scenarios. In an embodiment, the FTM controller 142 also uses TSF_ISTA_1 to adjust the TSF timer 146 when an ACK of FTM request 508 is not received by ISTA, at least in some scenarios.

Figure 6:
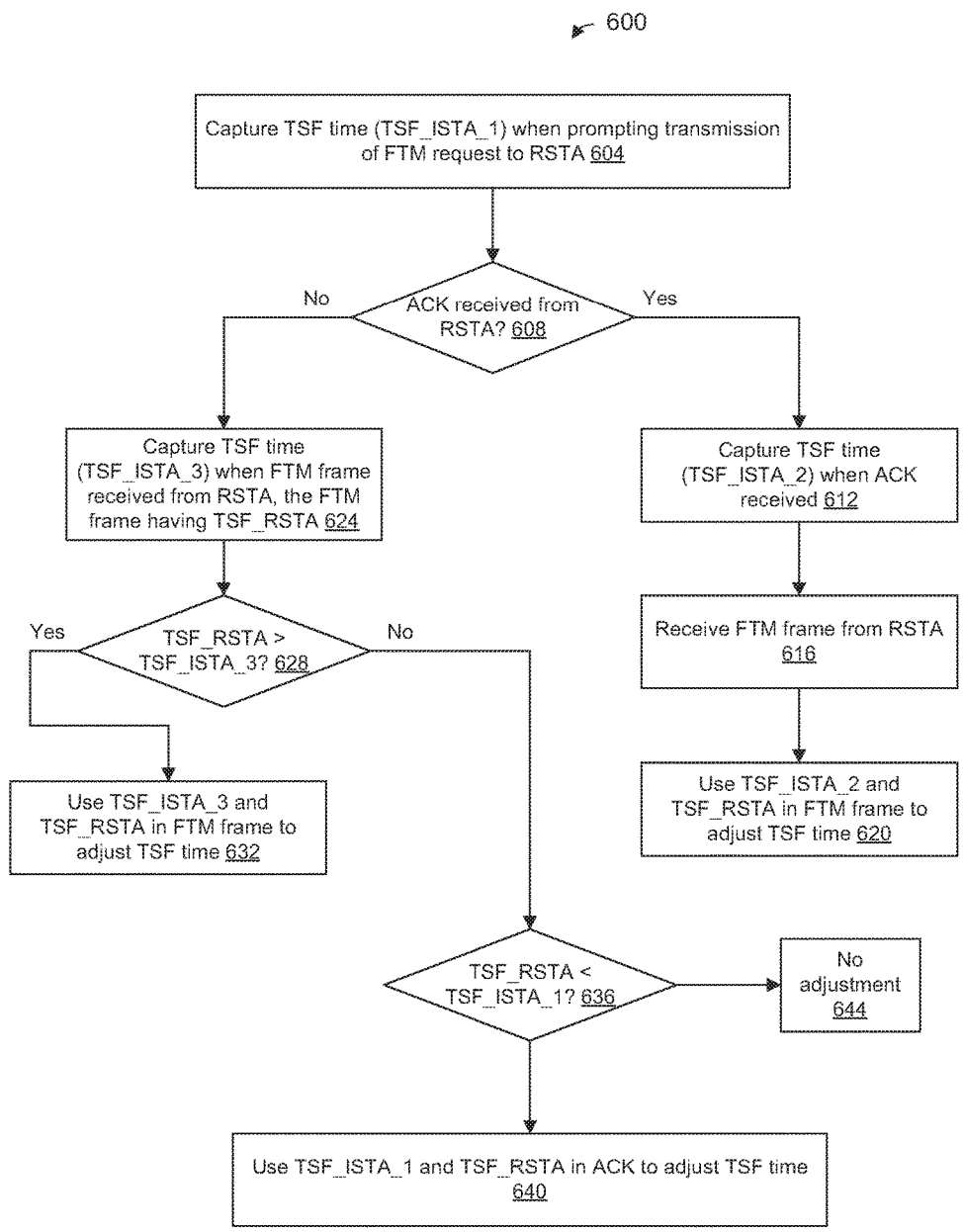
FIG. 6 is a flow diagram of an example method of adjusting time values of a timer of a communication device, according to an embodiment.

FIG. 6 is a flow diagram of an example method 600 of adjusting a timer maintained by a communication device, according to an embodiment. The method 600 is described in the context of the FTM controller 142 and the TSF timer 146 merely for explanatory purposes. In other embodiments, the method 600 is implemented by another suitable controller and/or another suitable timer. Additionally, the method 600 is described in the context of the timing diagram 500 of FIG. 5 merely for explanatory purposes. In other embodiments, the method 600 is implemented in the context of other suitable types of communication frame exchanges.

At block 604, a communication device records (captures) a timer value when prompting a communication device to transmit a communication frame associated with a timing measurement procedure. For example, the FTM controller 142 captures a value of the TSF timer 146 (TSF_ISTA_1) when prompting the network interface 122 to transmit the FTM request 508. Prompting the network interface 122 to transmit the FTM request 508 includes sending the data unit 504 to the MAC processor 126, in an embodiment.

At block 608, the communication device determines whether the communication device received an acknowledgement (ACK) of the communication frame transmitted in connection with block 604, the ACK being transmitted by another communication device in response to the communication frame transmitted in connection with block 604. For example, the FTM controller 142 determines whether the network interface 122 received and ACK responsive to the FTM request 508. Determining whether the network interface 122 received and ACK includes determining whether the MAC processor 126 received the ACK, in an embodiment.

If the communication device determines, at block 608, that the ACK was received, the flow proceeds to block 612. At block 612, the communication device captures a timer value corresponding to when the communication device receives the ACK. For example, the FTM controller 142 captures a value of the TSF timer 146 (TSF_ISTA_2) when the FTM controller 142 is informed by the MAC processor 126 that the ACK was received.

At block 616, the communication device receives a subsequent communication frame associated with the timing measurement procedure. In an embodiment, the subsequent communication frame received at block 616 is responsive to the communication frame in connection with block 604. For example, the network interface 122 receives FTM frame 544, which includes a time value determined by RSTA (TSF_RSTA) when RSTA received the FTM request 508 or a retransmission 512, 524 of the FTM requests 508, according to an embodiment. The network interface 122 sends the data unit 552 to the FTM controller 142, where the data unit 552 includes the TSF_RSTA, in all embodiment.

At block 620, the communication device uses the timer value captured at block 612 and the timer value in the frame received at block 616 to adjust time values associated with the timer of the communication device. For example, in an embodiment, the FTM controller 142 calculates an offset based on a comparison of TSF_ISTA_2 and the TSF_RSTA received at block 616 (e.g., TSF_ISTA_2−TSF_RSTA, or TSF_RSTA−TSF_ISTA_2). The offset is calculated further based on other factors such as one or more of an estimated delay between when the FTM controller 182 of RSTA captured TSF_RSTA and when the communication frame was received by FTM controller 142. In an embodiment, the estimated delay is calculated based on i) an estimated time of flight between RSTA and ISTA, ii) an estimated delay between when the FTM controller 182 of RSTA instructed the MAC processor 166 to transmit the communication frame and when the PHY processor 170 actually transmitted the communication frame, etc.

In an embodiment, adjusting the time values at block 620 comprises calculating an offset, and then adding the offset to values of the TSF timer 146 when ISTA performs time measurement frame exchanges with RSTA. In an embodiment, adjusting the time values at block 620 comprises calculating an offset, and then advancing (or turning back) the TSF timer 146 using the offset.

Referring again to block 608, if it is determined that the ACK was not received, the flow proceeds to block 624. At block 624, the communication device captures a timer value corresponding to when the communication device receives a subsequent communication frame associated with the timing measurement procedure. In an embodiment, the subsequent communication frame received at block 624 is responsive to the communication frame in connection with block 604. For example, the network interface 122 receives FTM frame 544, which includes a time value determined by RSTA (TSF_RSTA) when RSTA received the FTM request 508 or a retransmission 512, 524 of the FTM requests 508, according to an embodiment. The network interface 122 sends the data unit 552 to the FTM controller 142, where the data unit 552 includes the TSF_RSTA, in all embodiment.

The FTM controller 142 captures a value of the TSF timer 146 (TSF_ISTA_3) when the FTM controller 142 is informed by the MAC processor 126 that the communication frame having TSF_RSTA was received.

At block 628, the communication device determines whether the timer value in the communication frame received at block 624 is greater than the timer value captured at block 624. For example, in an embodiment, the FTM controller 142 determines whether TSF_RSTA is greater than TFS_ISTA_3. If it is determined at block 628 that the timer value in the communication frame received at block 624 is greater than the timer value captured at block 624, the flow proceeds to block 632.

At block 632, the communication device uses the timer value captured at block 624 and the timer value in the frame received at block 624 to adjust time values associated with the timer of the communication device. For example, in an embodiment, the FTM controller 142 calculates an offset based on a comparison of TSF_ISTA_3 and the TSF_RSTA received at block 624 (e.g., TSF_ISTA_3−TSF_RSTA, or TSF_RSTA−TSF_ISTA_3). In some embodiments, the offset is calculated further based on other factors in a manner similar to that described above with respect to block 620.

In an embodiment, adjusting the time values at block 624 comprises calculating an offset, and then adding the offset to values of the TSF timer 146 when ISTA performs time measurement frame exchanges with RSTA. In an embodiment, adjusting the time values at block 624 comprises calculating an offset, and then advancing (or turning back) the TSF timer 146 using the offset.

Referring again to block 628, if it is determined at block 628 that the timer value in the communication frame received at block 624 is not greater than the timer value captured at block 624, the flow proceeds to block 636.

At block 636, the communication device determines whether the timer value in the communication frame received at block 624 is less than the timer value captured at block 604. For example, in an embodiment, the FTM controller 142 determines whether TSF_RSTA is less than TFS_TSTA_1. If it is determined at block 628 that the timer value in the communication frame received at block 624 is less than the timer value captured at block 604, the flow proceeds to block 640.

At block 640, the communication device uses the timer value captured at block 604 and the timer value in the frame received at block 624 to adjust time values associated with the timer of the communication device. For example, in an embodiment, the FTM controller 142 calculates an offset based on a comparison of TSF_ISTA_1 and the TSF_RSTA received at block 624 (e.g., TSF_ISTA_1−TSF_RSTA, or TSF_RSTA−TSF_ISTA_1). In some embodiments, the offset is calculated further based on other factors in a manner similar to that described above with respect to block 620.

In an embodiment, adjusting the time values at block 640 comprises calculating an offset, and then adding the offset to values of the TSF timer 146 when ISTA performs time measurement frame exchanges with RSTA. In an embodiment, adjusting the time values at block 624 comprises calculating an offset, and then advancing (or turning back) the TSF timer 146 using the offset.

Referring again to block 636, if it is determined at block 636 that the timer value in the communication frame received at block 624 is not less than the timer value captured at block 604, the flow proceeds to block 644.

At block 644, no adjustment of time values is made. For example, in an embodiment, the FTM controller 142 does not adjust time values of the TSF timer 146. In other embodiments, the time values of the TSF timer 146 are adjusted using a suitable technique.

Figure 7:
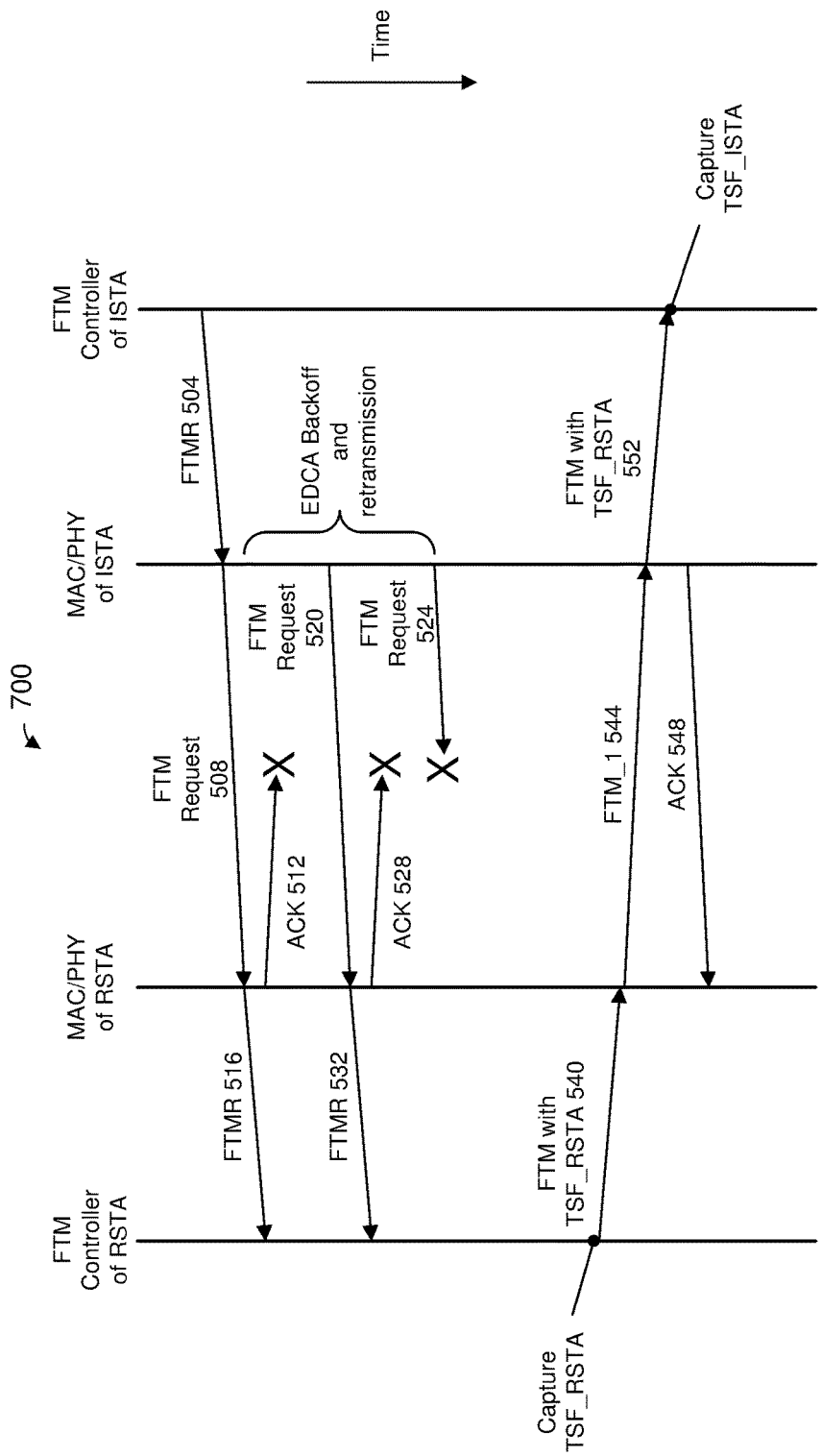
FIG. 7 is a signal diagram illustrating another example technique of adjusting time values of a timer of a communication device, according to an embodiment.

FIG. 7 is a timing diagram 700 of an example FTM frame exchange in which some communication frames are not properly received, according to an embodiment. The timing diagram 700 is similar to the timing diagram 500 of FIG. 5, but a different embodiment is discussed with reference to the timing diagram 700.

The timing diagram 700 is described with reference to FIG. 1 merely for explanatory purposes. For example, the timing diagram 700 is described in the context of AP 114-1 acting as ISTA and the client station 154-1 acting as RSTA, merely as all illustrative embodiment. In other embodiments, another AP acts as RSTA and/or a client station acts as ISTA. In some embodiments, other communication devices having suitable architectures different than the architectures illustrated in FIG. 1 act as ISTA and/or RSTA.

Unlike the embodiment discussed with reference to FIG. 5, ISTA need not capture a value of the TSF timer of ISTA (e.g., the TSF timer 146) when the FTM request prompt 504 was sent (TSF_ISTA_1). Similarly, unlike the embodiment discussed with reference to FIG. 5, if the network interface 122 did receive the ACK 512 or the ACK 528, ISTA need not capture the value of the TSF timer 146 when the FTM controller 142 was notified of the ACK 512/528 (TSF_ISTA_2).

Similarly, unlike the embodiment discussed with reference to FIG. 5, RSTA need not capture TSF_RSTA when the FTM request 508 is received and/or when retransmissions 502/524 are received.

Rather, in an embodiment, RSTA records a time corresponding to when the transmission of FTM frame 544 is initiated. For example, in an embodiment, the FTM controller 182 records the TSF time (TSF_RSTA) when sending the FTM prompt 540 to the MAC processor (e.g., the MAC processor 166) and/or the PHY processor (e.g., the PHY processor 170) of RSTA, where the data unit 540 includes the TSF_RSTA.

When the FTM controller 142 receives the data unit 552 indicating the reception of the FTM frame 544, the FTM controller 142 records a value of the TSF timer 146 when the data unit 552 was received by the FTM controller 142 (TSF_ISTA).

In an embodiment, the FTM controller 142 uses TSF_ISTA and TSF_RSTA to adjust the TSF timer 146, at least in some scenarios.

FIG. 8A is a flow diagram of an example method 800 of performing a communication frame exchange as part of a timing measurement procedure, according to an embodiment. The method 800 is described in the context of the FTM controller 182 and the TSF timer 186 merely for explanatory purposes. In other embodiments, the method 800 is implemented by another suitable controller and/or another suitable timer. Additionally, the method 800 is described in the context of the timing diagram 700 of FIG. 7 merely for explanatory purposes. In other embodiments, the method 800 is implemented in the context of other suitable types of communication frame exchanges.

At block 804, a communication device records (captures) a timer value when prompting the communication device to transmit a communication frame associated with a timing measurement procedure. For example, the FTM controller 182 captures a value of the TSF timer 186 (TSF_RSTA) when prompting the network interface 162 to transmit the FTM frame 544. In an embodiment, the FTM control 182 performs block 804.

At block 808, the communication device transmits the communication frame associated with the timing measurement procedure, where the communication includes the timer value captured at block 804. For example, in an embodiment, the network interface 162 transmits the FTM frame 544. In an embodiment, block 808 includes the FTM controller 182 causing the network interface 162 to transmit the FTM frame 544. In an embodiment, causing the network interface 162 to transmit the FTM frame 544 includes the FTM controller 182 sending the data unit 540 to the MAC processor 166, in an embodiment. The data unit 540 includes the TSF_RSTA, and the FTM frame 544 also includes the TSF_RSTA.

FIG. 8B is a flow diagram of an example method 850 of adjusting timing values associated with a timing measurement procedure, according to an embodiment. The method 850 is described in the context of the FTM controller 142 and the TSF timer 146 merely for explanatory purposes. In other embodiments, the method 850 is implemented by another suitable controller and/or another suitable timer. Additionally, the method 850 is described in the context of the timing diagram 700 of FIG. 7 merely for explanatory purposes. In other embodiments, the method 850 is implemented in the context of other suitable types of communication frame exchanges.

At block 854, the communication device records a time at Which a communication frame associated with a timing measurement procedure is received. The communication frame includes a timer value (TSF_RSTA) indicative of when another communication device transmitted the communication frame. For example, in an embodiment, when the FTM controller 142 receives the data unit 552 indicating the reception of the FTM frame 544, the FTM controller 142 records a value of the TSF timer 146 when the data unit 552 was received by the FTM controller 142 (TSF/ISTA). The data unit 552 includes TSF_RSTA, in an embodiment.

At block 858, the communication device uses the timer value captured at block 854 and the timer value in the frame received at block 854 to adjust time values associated with the timer of the communication device. For example, in an embodiment, the FTM controller 142 calculates an offset based on a comparison of TSF_ISTA and the TSF_RSTA received at block 854 (e.g., TSF_ISTA−TSF_RSTA, or TSF_RSTA−TSF_ISTA). The offset is calculated further based on other factors such as one or more of an estimated delay between when the FTM controller 182 of RSTA captured TSF_RSTA and when the communication frame was received by FTM controller 142. In an embodiment, the estimated delay is calculated based on i) an estimated time of flight between RSTA and ISTA, ii) an estimated delay between when the FTM controller 182 of RSTA instructed the MAC processor 166 to transmit the communication frame and when the PHY processor 170 actually transmitted the communication frame, etc.

In an embodiment, adjusting the time values at block 854 comprises calculating an offset, and then adding the offset to values of the TSF timer 146 when ISTA performs time measurement frame exchanges with RSTA. In an embodiment, adjusting the time values at block 854 comprises calculating an offset, and then advancing (or turning back) the TSF timer 146 using the offset.

Figure 9:
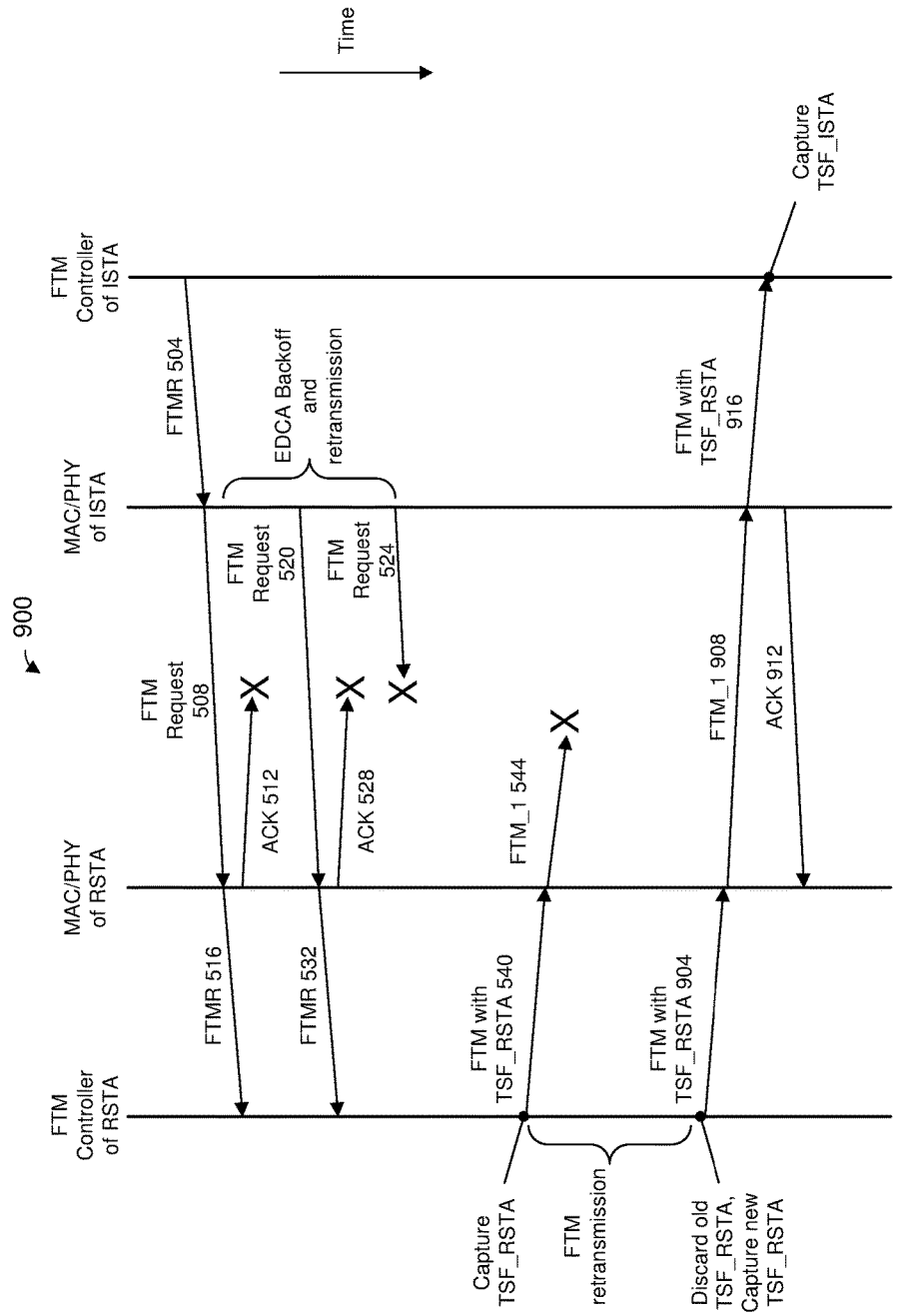
FIG. 9 is a signal diagram illustrating yet another example technique of adjusting time values of a timer of a communication device, according to an embodiment.

FIG. 9 is a timing diagram 900 of an example FTM frame exchange in which some communication frames are not properly received, according to an embodiment. The timing diagram 900 is similar to the timing diagram 700 of FIG. 7, but a different embodiment is discussed with reference to the timing diagram 900.

The timing diagram 900 is described with reference to FIG. 1 merely for explanatory purposes. For example, the timing diagram 900 is described in the context of AP 114-1 acting as ISTA and the client station 154-1 acting as RSTA, merely as an illustrative embodiment. In other embodiments, another. AP acts as RSTA and/or a client station acts as ISTA. In some embodiments, other communication devices having suitable architectures different than the architectures illustrated in FIG. 1 act as ISTA and/or RSTA.

Unlike the embodiment discussed with reference to FIG. 7, the FTM frame 544 is not properly received (e.g., due to a collision, poor channel conditions, etc.). Thus, the FTM controller 1182 does not receive an acknowledgment that ISTA received the FTM frame 544. In response to not receiving an acknowledgment that ISTA received the FTM frame 544, the FTM controller 182 performs a retransmission procedure as part of the timing measurement protocol, in an embodiment.

For example, in an embodiment, the FTM controller 182 records the TSF time (TSF_RSTA) when sending the FTM prompt 904 to the MAC processor (e.g., the MAC processor 166) and/or the PITY processor (e.g., the PHY processor 170) of RSTA, where the data unit 904 includes the TSF_RSTA. Responsive to the prompt, the network interface 162 generates and transmits an FTM frame 908 which includes the TSF_RSTA.

The network interface (e.g., the network interface 122) of ISTA receives the FTM frame 908 and generates/transmits an ACK 912 to RSTA. Additionally, the MAC processor (e.g., the MAC processor 126) of ISTA sends a data unit 916 to the FTM controller of ISTA (e.g., FTM controller 142) informing the FTM controller 142 that the FTM frame 908 from ISTA was received. The data unit 912 includes the TSF_RSTA. When the FTM controller 142 receives the data unit 916 indicating the reception of the FTM frame 908, the FTM controller 142 records a value of the TSF timer 146 when the data unit 916 was received by the FTM controller 142 (TSF_ISTA).

In an embodiment, the FTM controller 142 uses TSF_ISTA and TSF_RSTA to adjust the TSF timer 146, at least in some scenarios.

Figure 10:
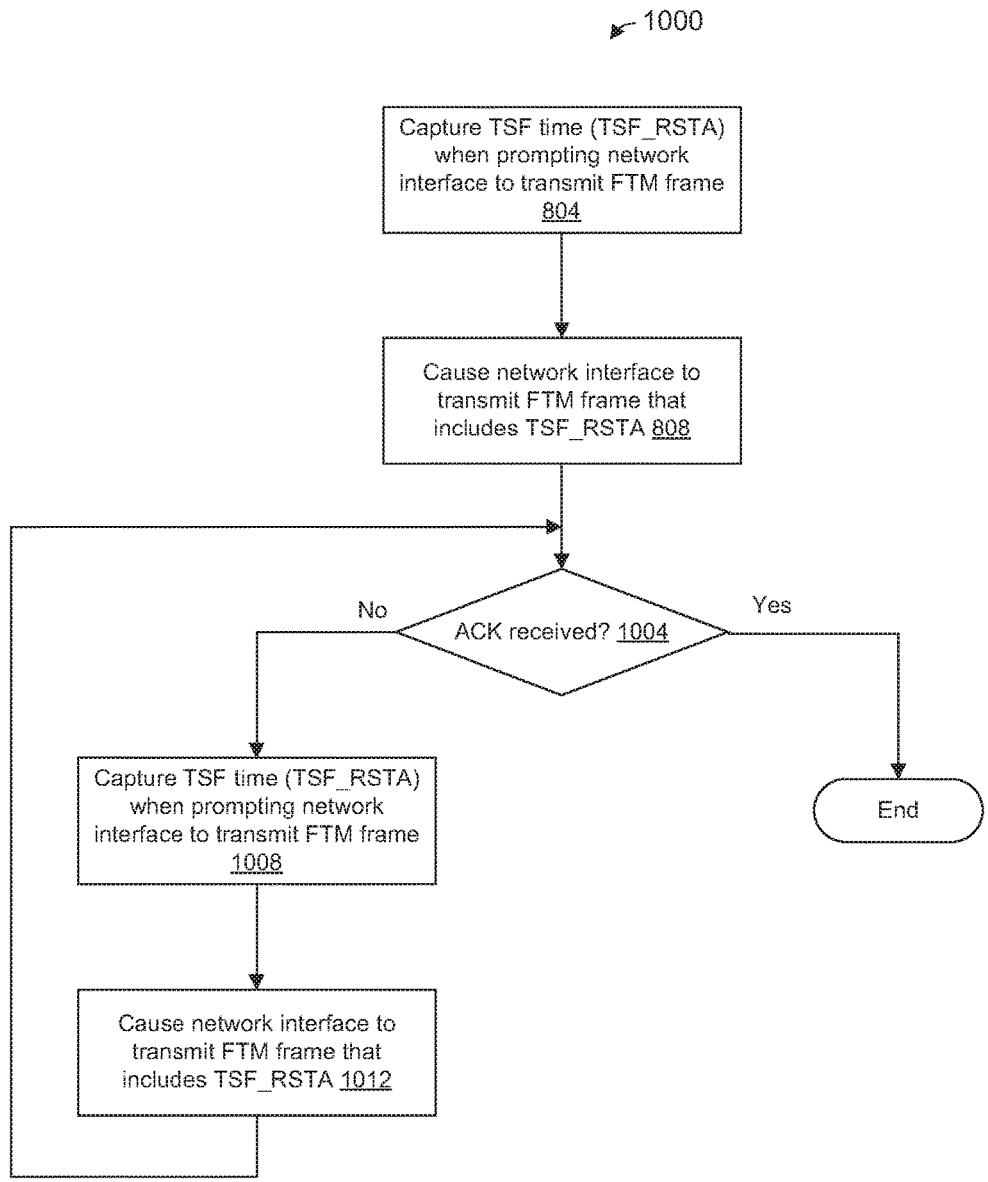
FIG. 10 is a flow diagram of yet another example method of adjusting time values of a timer of a communication device, according to an embodiment.

FIG. 10 is a flow diagram of an example method 1000 of performing a communication frame exchange as part of a timing measurement procedure, according to an embodiment. The method 1000 is described in the context of the FTM controller 182 and the TSF timer 186 merely for explanatory purposes. In other embodiments, the method 1000 is implemented by another suitable controller and/or another suitable timer. Additionally, the method 1000 is described in the context of the timing diagram 900 of FIG. 9 merely for explanatory purposes. In other embodiments, the method 1000 is implemented in the context of other suitable types of communication frame exchanges.

The flow diagram 1000 includes like-numbered elements of FIG. 8A which are not discussed in detail for purposes of brevity.

After the FTM frame is transmitted at block 808, the communication device determines, at block 1004, whether an ACK of the FTM frame was received. If an ACK was received, the flow ends. On the other hand, if it is determined at block 1004 that an ACK was not received, the flow proceeds to block 1008.

At block 1008, the communication device records (captures) a timer value when prompting the communication device to transmit a retransmission of the communication frame transmitted at block 808. For example, the FTM controller 182 captures a value of the TSF timer 186 (TSF_RSTA) when prompting the network interface 162 to transmit the FTM frame 908. In an embodiment, the FTM controller 182 performs block 1008.

At block 1012, the communication device transmits the communication frame corresponding to the retransmission of the frame transmitted at block 808, where the communication includes the timer value captured at block 1008. For example, in an embodiment, the network interface 162 transmits the FTM frame 908. In an embodiment, block 1012 includes the FTM controller 182 causing the network interface 162 to transmit the FTM frame 908. In an embodiment, causing the network interface 162 to transmit the FTM frame 544 includes the FTM controller 182 sending the data unit 904 to the MAC processor 166, in an embodiment. The data unit 904 includes the TSF_RSTA, and the FTM frame 908 also includes the TSF_RSTA.

The flow proceeds back to block 1004, at which it is determined whether an ACK of the FTM frame transmitted at block 1012 was received. If an ACK was received, the flow ends. On the other hand, if it is determined at block 1004 that an ACK was not received, the flow proceeds to block 1008.

Figure 11:
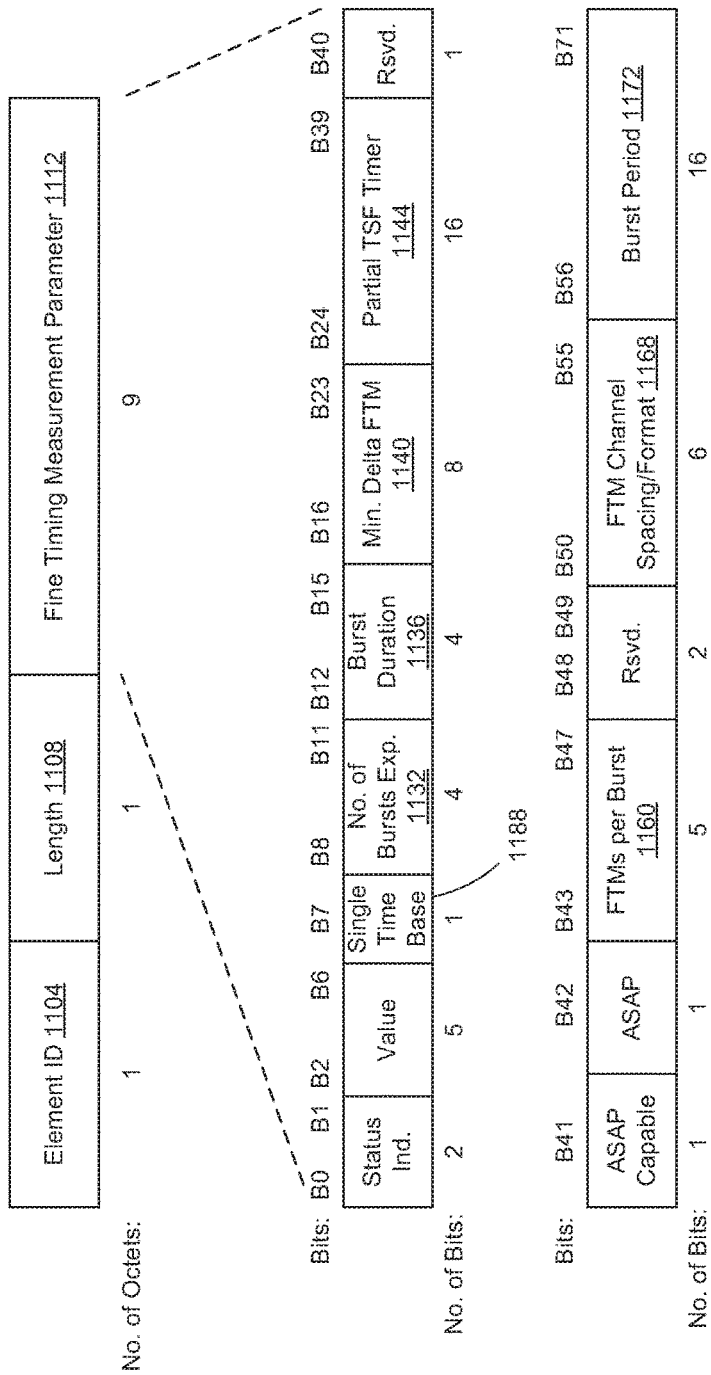
FIG. 11 is a diagram of an example information element exchanged between devices in a wireless communication network, according to an embodiment.

FIG. 11 is a diagram of an example information element (IE) 1100 that is utilized by a first communication device to provide FTM scheduling information to a second communication device in preparation for an FTM exchange between the first communication device and the second communication device. The IE 1100 includes an element identifier (ID) field 1104 having a value indicating that the IE 1100 corresponds to FTM scheduling information. The IE 1100 also includes a length field 1108 that includes a value indicating a length of the IE 1100. The IE 1100 also includes an FTM parameter field 11:12 for including FTM information regarding a single FTM session.

For example, the FTM parameter field 1112 includes a number of bursts exponent field 1132 that specifies an exponent value exp corresponding to a number of FTM bursts in the FTM session specified by 2^exp.

A burst timeout field 1136 specifies a duration of each burst in the FTM session.

A minimum delta FTM field 1140 specifies a minimum time between consecutive FTM packets (e.g., measured from a start of an FTM packet to a start of a next FTM packet) within a burst.

A partial TSF timer field 1144 indicates a time when the first burst of the FTM session starts.

An FTMs per burst field 1160 specifies a number of FTM packets in each FTM burst.

An FTM channel spacing/format field 1168 specifies information regarding the channel via which FTM packets will be transmitted and a PHY protocol data unit (PPDU) format that will be used during the FTM session. For example, in an illustrative embodiment, the field 1168 specifies information such as a channel bandwidth to be used, a PPDU format (e.g., IEEE 802.11n, IEEE 802.11ac, etc.), etc.

A burst period field 1172 specifies an interval between two bursts in the FTM session.

Some RSTAs are not configured to include TSF times (e.g., TSF_RSTA) in FTM frames, in some embodiments and/or scenarios. In some embodiments, some RSTAs do not use separate time bases (e.g., separate timers) for TSF times and ToD/ToA times. Thus, in some embodiments, the IE 1100 includes a field 1188 to indicate whether a communication device is capable of indicating a TSF time (e.g., separate from a ToD/ToA time base) in FTM frames. RSTA transmits the IE 1100 in a communication frame to ISTA. In an embodiment, if an ISTA (e.g., FTM controller 142) determines, by examining the field 1188, that RSTA does not include TSF times (e.g., separate from a ToD/ToA time base) in FTM frames, then the ISTA uses a technique to adjust the TSF timer of the ISTA different than discussed above. On the other hand, if the ISTA (e.g., FTM controller 142) determines, by examining the field 1188, that RSTA does include TSF times (e.g., separate from a ToD/ToA time base) in FTM frames, then the ISTA uses techniques such as discussed above to adjust the TSF timer of the ISTA, in some embodiments.

In some embodiments, the field 1188 is included in another suitable information element, such as in a reserved field of an extended capabilities element defined the IEEE 802.11 Standard. Thus, in some embodiments, the ISTA (e.g., FTM controller 142) determines whether RSTA includes TSF times (e.g., separate from a ToD/ToA time base) in FTM frames by examining the field 1188, which is located in another suitable information element.

Referring again to FIG. 1, in some embodiments, a client station 154 sends a request to the AP 114-1, the request being for information regarding neighboring APs (e.g., such as AP 114-2). In response to such a request, the AP 114-1 transmits to the client station 154 a "Neighbor Report" containing information about neighboring APs. In some embodiments, the client station 154 uses information in the Neighbor Report for identifying potential AP candidates for a new association. In some embodiments, the client station 154 uses information in the Neighbor Report for avoiding channels being utilized by neighboring basic service sets (BSSs).

Figure 12A:
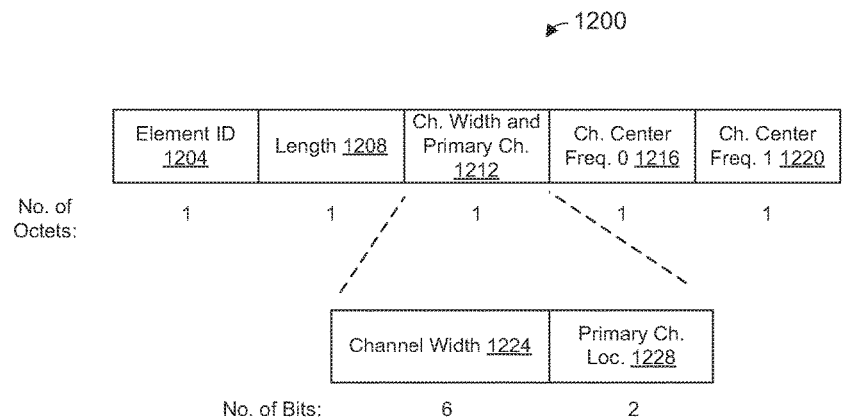
FIGS. 12A-C are diagrams of further example information elements exchanged between devices in a wireless communication network, according to various embodiments.
Figure 12B:
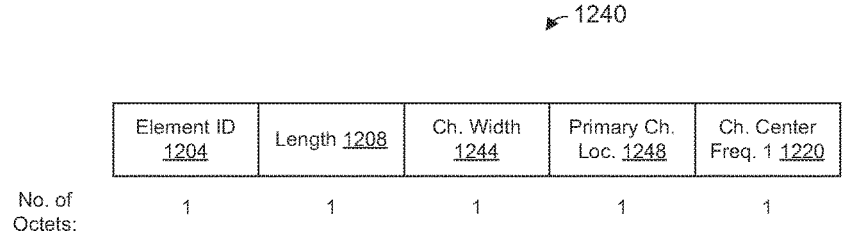
Figure 12C:
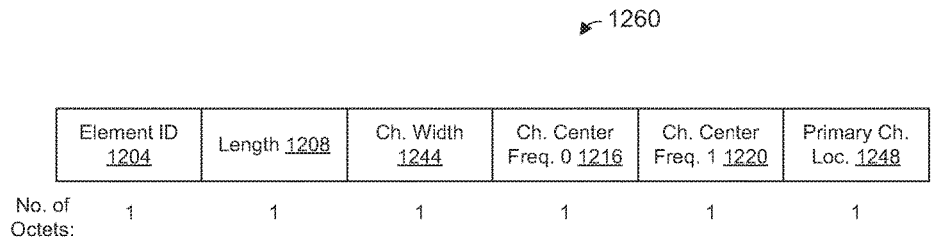

In some embodiments, the Neighbor Report includes an information element referred to herein as a "Wider Bandwidth Channel" information element. FIGS. 12A-12C are diagrams of various embodiments of Wider Bandwidth Channel information elements.

Referring now to FIG. 12A, according to an embodiment, an example Wider. Bandwidth Channel (IF) IE 1200 is for reporting information regarding a basic service set (BSS). The IE 1200 includes an element identifier (ID) field 1204 having a value indicating that the IE 1200 is a Wider. Bandwidth. Channel IE. The IE 1200 also includes a length field 1208 that includes a value indicating a length of the IE 1200. The IE 1200 also includes a channel width and primary channel location field 1212 for including information regarding a width of a channel utilized by the BSS and a channel location of a primary channel of the BSS, according to an embodiment.

The IE 1200 further includes a field 1216 for indicating a center frequency of a first frequency segment (segment 0) utilized by the BSS. The IE 1200 further includes a field 1220 for indicating a center frequency of a second frequency segment (segment 1) utilized by the BSS.

In an embodiment, the field 1212 includes a subfield 1224 for indicating the channel width, and a subfield 1228 for indicating the location of the primary channel.

In some embodiments, devices in a BSS may transmit communication frames at a bandwidth corresponding to the channel bandwidth specified by the channel width subfield 1224, but may also occasionally transmit communication frames at a narrower bandwidth in the primary channel. A communication device merely monitoring (e.g., using energy level detection and/or another suitable channel monitoring technique) a channel of the BSS at a width specified by the channel width subfield 1224 may not detect the narrower transmissions in the primary channel. Thus, in some embodiments, providing the primary channel location subfield 1228 improves the ability of communication devices to monitor channel activity of the BSS.

FIG. 12B is a diagram of another example, Wider Bandwidth Channel IE 1240. The IF 1240 includes many of the same fields of the example IF, 1200 of FIG. 12A, and like-numbered elements are not described in detail for purposes of brevity.

Comparing to the IE 1240 to the IE 1200, the IE 1240 omits the field 1216 and replaces field 1212 with two separate fields 1244 (channel width) and 1248 (primary channel location). In an embodiment, a communication protocol according to which devices in the BSS operate defines a channelization i) that requires the primary channel to be in the first frequency segment (segment 0), and ii) is defined such that, once the primary channel location is known, the center frequency of the first frequency segment can be determined. Thus, in some embodiments, the field 1216 can be omitted, as in the embodiment of FIG. 12B.

FIG. 12C is a diagram of yet another example, Wider Bandwidth Channel II 1260. The IF 1260 includes many of the same fields of the example IF 1200 of FIG. 12A and the IE 1240 of FIG. 12B, and like-numbered elements are not described in detail for purposes of brevity.

Comparing to the IE 1260 to the IE 1240, the IE 1260 includes the field 1216 and thus is one octet longer than the IF 1240.

In various embodiments, the network interface 122 is configured to generate a communication frame that includes an IF such as the IE 1200, the IE 1240, and/or the IE 1260.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method, comprising:
   recording, at a controller of a first communication device, a first time value of a first clock corresponding to transmission of a first communication frame associated with a timing measurement procedure;
   determining, at the controller, whether the first communication device received an acknowledgment of the first communication frame;
   when the controller determines that the acknowledgment of the first communication frame was received by the first communication device:
      recording, at the controller, a second time value of the first clock corresponding to reception of the acknowledgment at the first communication device;
   receiving, at the controller, a data unit corresponding to a second communication frame associated with the timing measurement procedure, wherein the data unit includes a time value of a second clock;
   when the controller determines that the acknowledgment of the first communication frame was received by the first communication device:
      using, at the controller, i) the second time value of the first clock, and ii) the time value of the second clock to adjust time values corresponding to the first clock; and
   when the controller determines that the acknowledgment of the first communication frame was not received by the first communication device:
      recording, at the controller, a third time value of the first clock corresponding to reception of the second communication frame at the first communication device,
      comparing, at the controller, the time value of the second clock to one or both of the first time value of the first clock and the third time value of the first clock to determine i) whether the time value of the second clock is less than the first time value of the first clock, and ii) whether the time value of the second clock is greater than the third time value of the first clock, and
      using, at the controller, the time value of the second clock and one of i) the first time value of the first clock, and ii) the third time value of the first clock to adjust time values corresponding to the first clock in response to comparing the time value of the second clock to one or both of the first time value of the first clock and the third time value of the first clock,
      wherein, when the controller determines that the time value of the second clock is i) not less than the first time value of the first clock, and ii) not greater than the third time value of the first clock, no adjustment of the time values is made corresponding to the first clock.

2. The method of claim 1, further comprising:
   using i) the first time value of the first clock, and ii) the time value of the second clock to adjust time values corresponding to the first clock in response to determining that the time value of the second clock is less than the first time value of the first clock.

3. The method of claim 1, comprising:
   when the controller determines that the time value of the second clock is not greater than the third time value of the first clock, determining whether the time value of the second clock is less than the first time value of the first clock.

4. The method of claim 1, further comprising:
   using i) the third time value of the first clock, and ii) the time value of the second clock to adjust time values corresponding to the first clock in response to determining that the time value of the second clock is greater than the third time value of the first clock.

5. The method of claim 1, further comprising:
   recording, at the controller, the third time value of the first clock corresponding to reception of the second communication frame at the first communication device whether or not the controller determines that the acknowledgment of the first communication frame was received by the first communication device.

6. An apparatus, comprising:
   a controller of a first communication device, the controller configured to execute machine readable instructions; and
   a memory coupled to the controller, the memory storing machine readable instructions that, when executed by the controller, cause the controller to:
      record a first time value of a first clock corresponding to transmission of a first communication frame associated with a timing measurement procedure;
      determine whether the first communication device received an acknowledgment of the first communication frame;

when the controller determines that the acknowledgment of the first communication frame was received by the first communication device:
  record a second time value of the first clock corresponding to reception of the acknowledgment at the first communication device;
receive a data unit corresponding to a second communication frame associated with the timing measurement procedure, wherein the data unit includes a time value of a second clock;
when the controller determines that the acknowledgment of the first communication frame was received by the first communication device:
  use i) the second time value of the first clock, and ii) the time value of the second clock to adjust time values corresponding to the first clock; and
when the controller determines that the acknowledgment of the first communication frame was not received by the first communication device:
  record a third time value of the first clock corresponding to reception of the second communication frame at the first communication device,
  compare the time value of the second clock to one or both of the first time value of the first clock and the third time value of the first clock to determine i) whether the time value of the second clock is less than the first time value of the first clock, and ii) whether the time value of the second clock is greater than the third time value of the first clock, and
  use the time value of the second clock and one of i) the first time value of the first clock, and ii) the third time value of the first clock to adjust time values corresponding to the first clock in response to comparing the time value of the second clock to one or both of the first time value of the first clock and the third time value of the first clock,
  wherein, when the controller determines that the time value of the second clock is i) not less than the first time value of the first clock, and ii) not greater than the third time value of the first clock, no adjustment of the time values is made corresponding to the first clock.

7. The apparatus of claim 6, wherein the memory further stores machine readable instructions that, when executed by the controller, cause the controller to:

use i) the first time value of the first clock, and ii) the time value of the second clock to adjust time values corresponding to the first clock in response to determining that the time value of the second clock is less than the first time value of the first clock.

8. The apparatus of claim 6, wherein the memory further stores machine readable instructions that, when executed by the controller, cause the controller to:

when the controller determines that the time value of the second clock is not greater than the third time value of the first clock, determine whether the time value of the second clock is less than the first time value of the first clock.

9. The apparatus of claim 6, wherein the memory further stores machine readable instructions that, when executed by the controller, cause the controller to:

use i) the third time value of the first clock, and ii) the time value of the second clock to adjust time values corresponding to the first clock in response to determining that the time value of the second clock is greater than the third time value of the first clock.

10. The apparatus of claim 6, wherein the memory further stores machine readable instructions that, when executed by the controller, cause the controller to:

record the third time value of the first clock corresponding to reception of the second communication frame at the first communication device whether or not the controller determines that the acknowledgment of the first communication frame was received by the first communication device.

* * * * *